United States Patent [19]
Okuno et al.

[11] Patent Number: 5,930,537
[45] Date of Patent: *Jul. 27, 1999

[54] CAMERA ADAPTED TO USE A FILM CARTRIDGE HAVING A MOVABLE LIGHT SHIELD DOOR

[75] Inventors: Ryoji Okuno, Kawasaki; Makoto Miyawaki, Yokohama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,284

[22] Filed: Jan. 3, 1997

Related U.S. Application Data

[63] Continuation of application No. 08/329,877, Oct. 27, 1994, abandoned.

[30] Foreign Application Priority Data

Oct. 28, 1993  [JP]  Japan ..................................... 5-291503

[51] Int. Cl.⁶ ............................. G03B 17/02; G03B 17/18
[52] U.S. Cl. ............................................ 396/281; 396/536
[58] Field of Search ..................................... 354/174, 275, 354/288; 396/281, 284, 535, 536, 538

[56] References Cited

U.S. PATENT DOCUMENTS

| | | | |
|---|---|---|---|
| 4,000,500 | 12/1976 | Ivester et al. ............................ | 354/174 |
| 4,647,168 | 3/1987 | Takahashi et al. ......................... | 354/86 |
| 4,809,867 | 3/1989 | Choi .......................................... | 220/211 |
| 4,845,733 | 7/1989 | Dieterlen et al. ......................... | 378/177 |
| 4,878,075 | 10/1989 | Cannon .................................. | 354/173.1 |
| 5,049,914 | 9/1991 | Dassero .................................... | 354/288 |
| 5,109,242 | 4/1992 | Massarsky ................................. | 354/75 |
| 5,231,438 | 7/1993 | Smart ....................................... | 354/281 |
| 5,250,972 | 10/1993 | Hirohata et al. ......................... | 354/288 |
| 5,394,213 | 2/1995 | Hazama et al. ........................... | 354/275 |
| 5,432,570 | 7/1995 | Ueda ........................................ | 354/105 |
| 5,459,548 | 10/1995 | Matsuda et al. .......................... | 355/72 |
| 5,812,896 | 9/1998 | Okuno et al. ............................ | 396/513 |

FOREIGN PATENT DOCUMENTS

| | | |
|---|---|---|
| 0252993 | 1/1988 | European Pat. Off. . |
| 0280177 | 8/1988 | European Pat. Off. . |
| 0488499 | 6/1992 | European Pat. Off. . |
| 3204978 | 8/1983 | Germany . |
| 3-75637 | 3/1991 | Japan . |

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

A camera adapted to use an image recording medium cartridge having a cover for allowing an image recording medium to exit from or withdraw into the image recording medium cartridge. The camera includes operation unit for performing an operation related to at least one of loading and unloading of the cartridge with respect to the camera. A determination unit determines an operation state of the operation unit in accordance with a time.

22 Claims, 24 Drawing Sheets

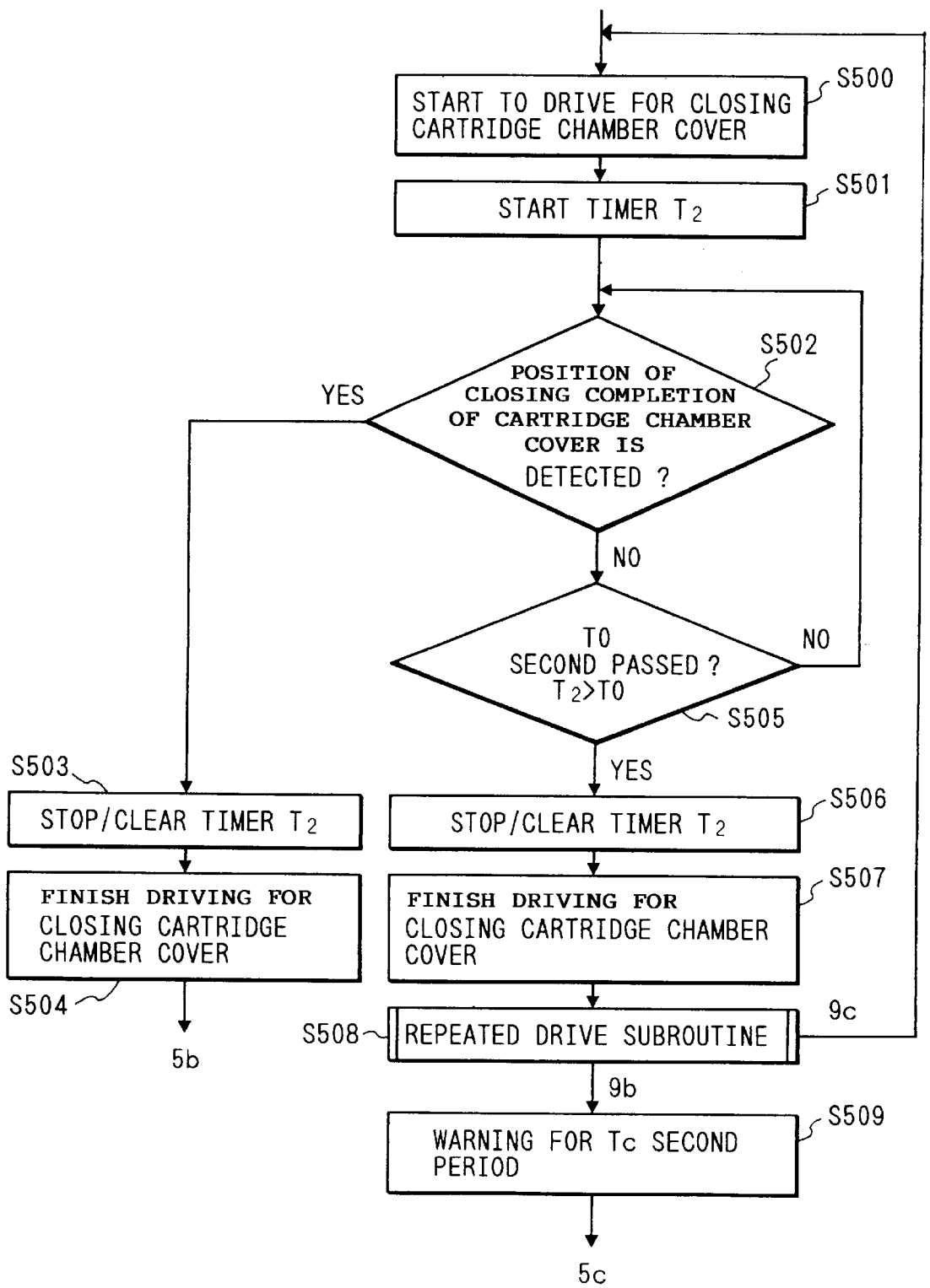

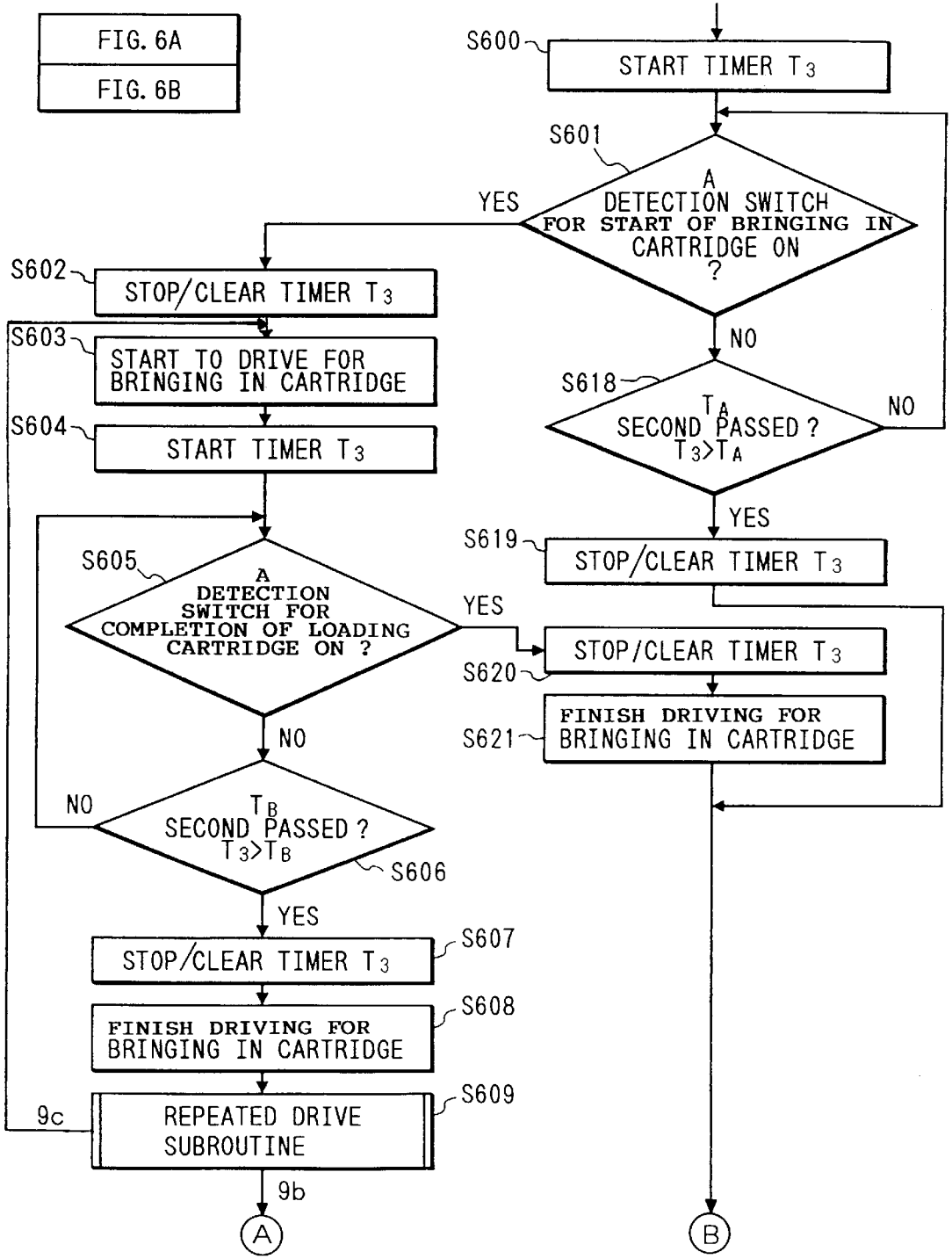

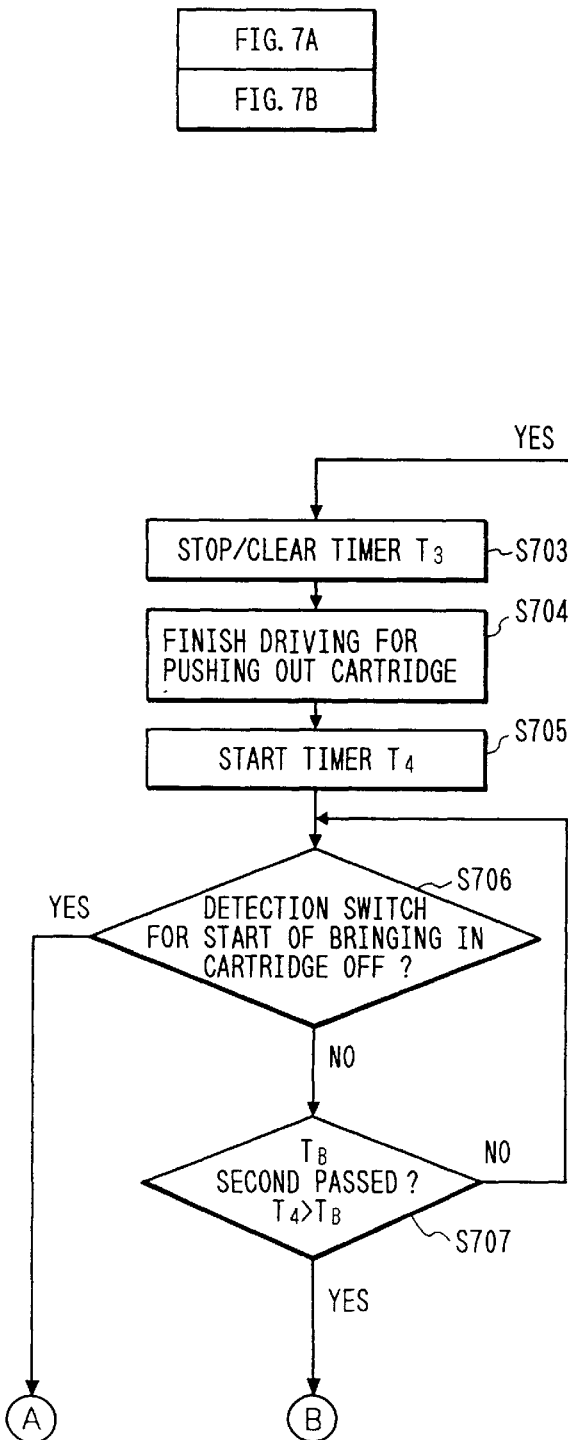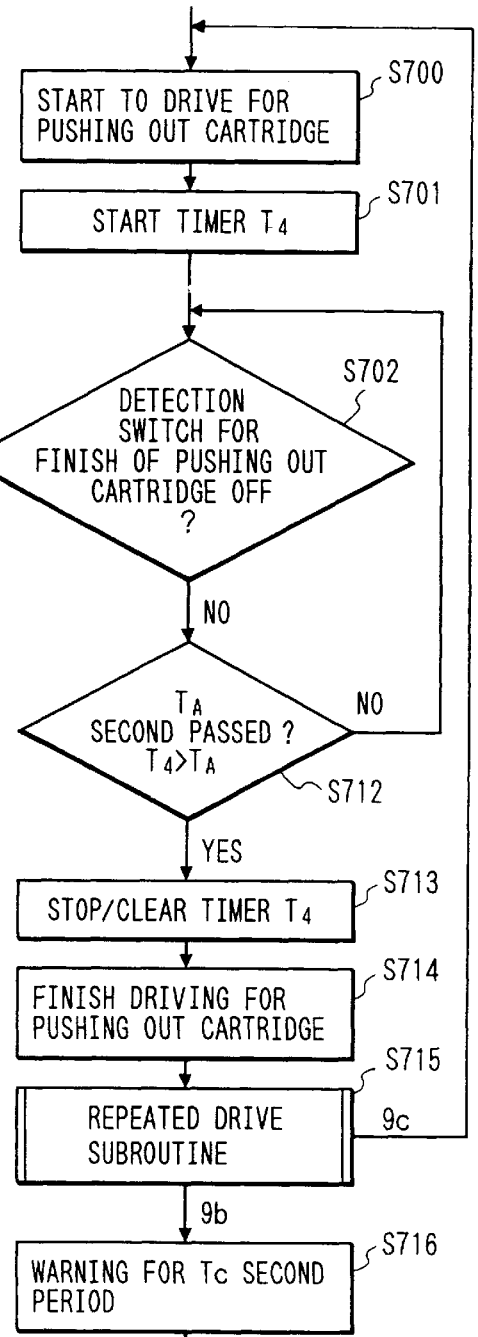

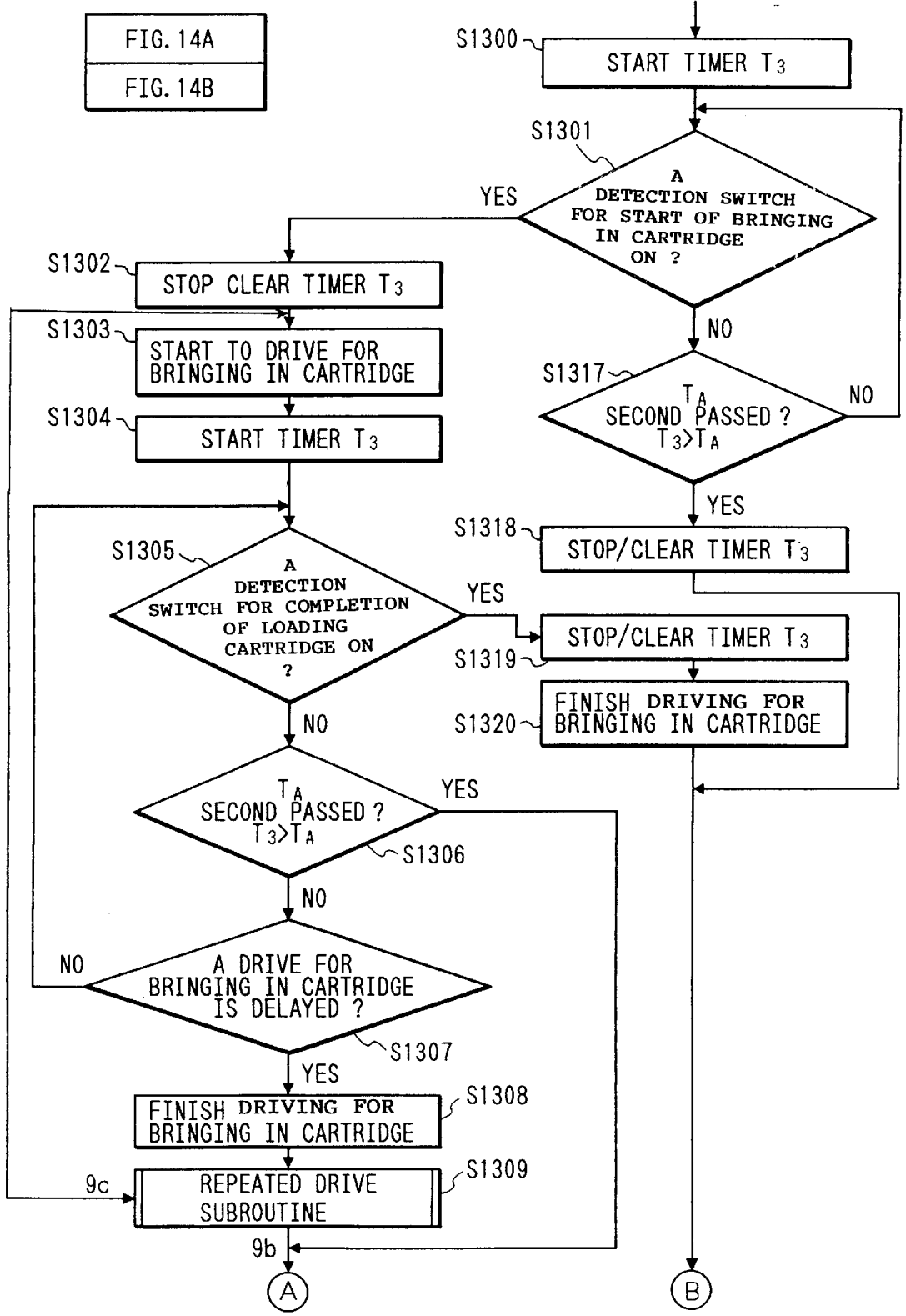

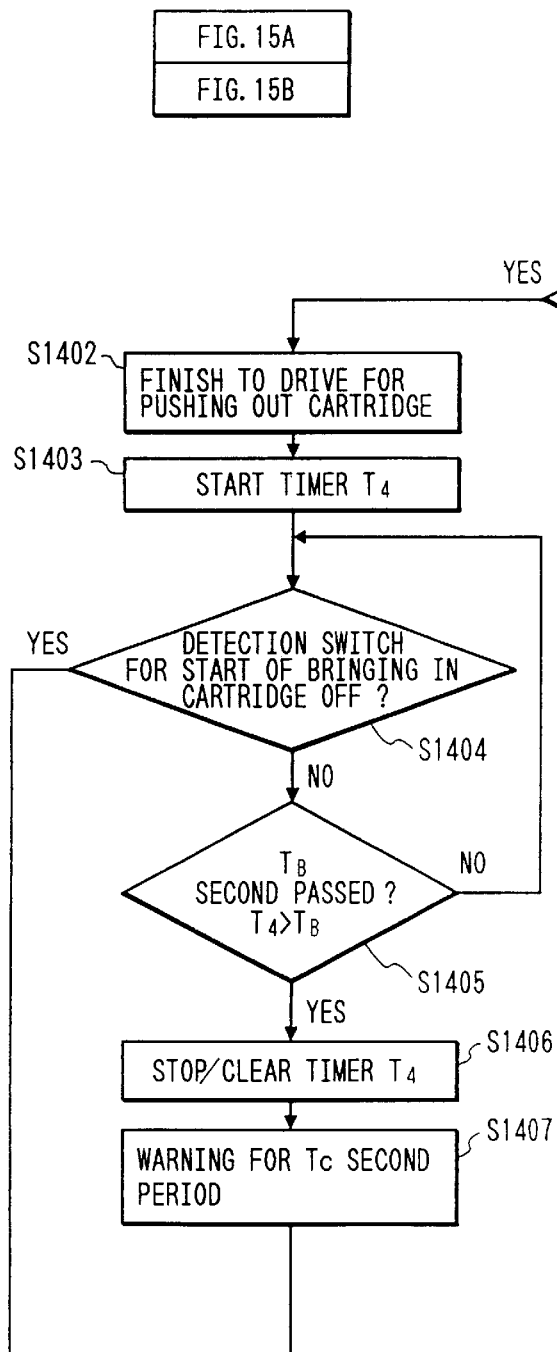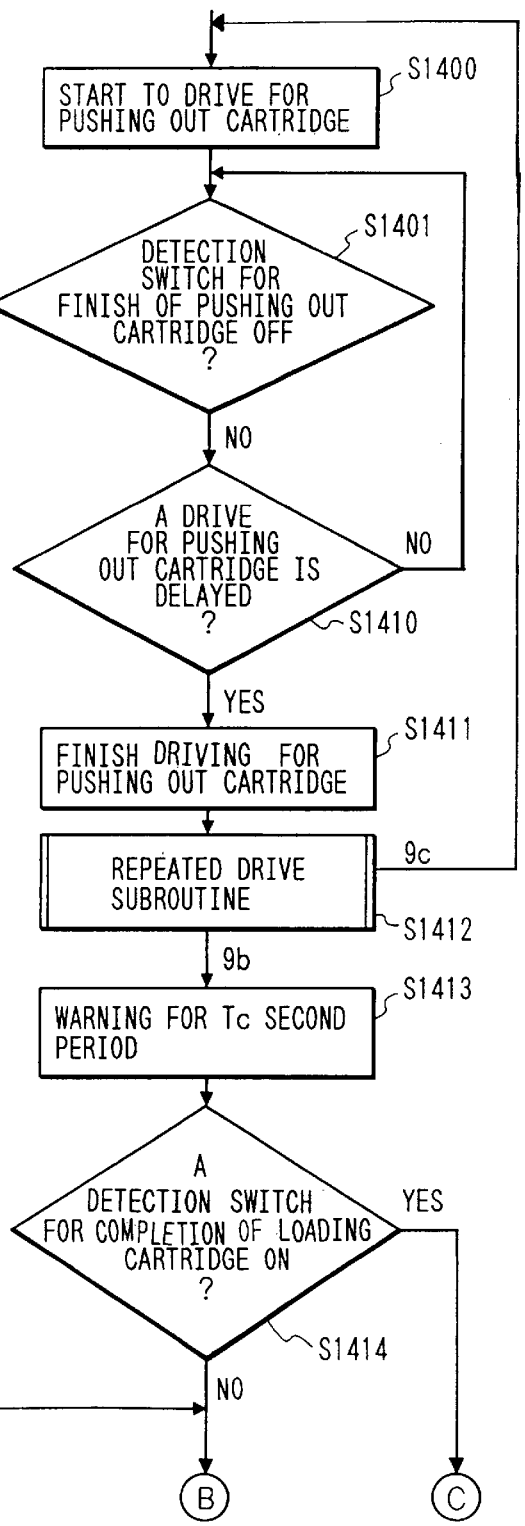
FIG. 15

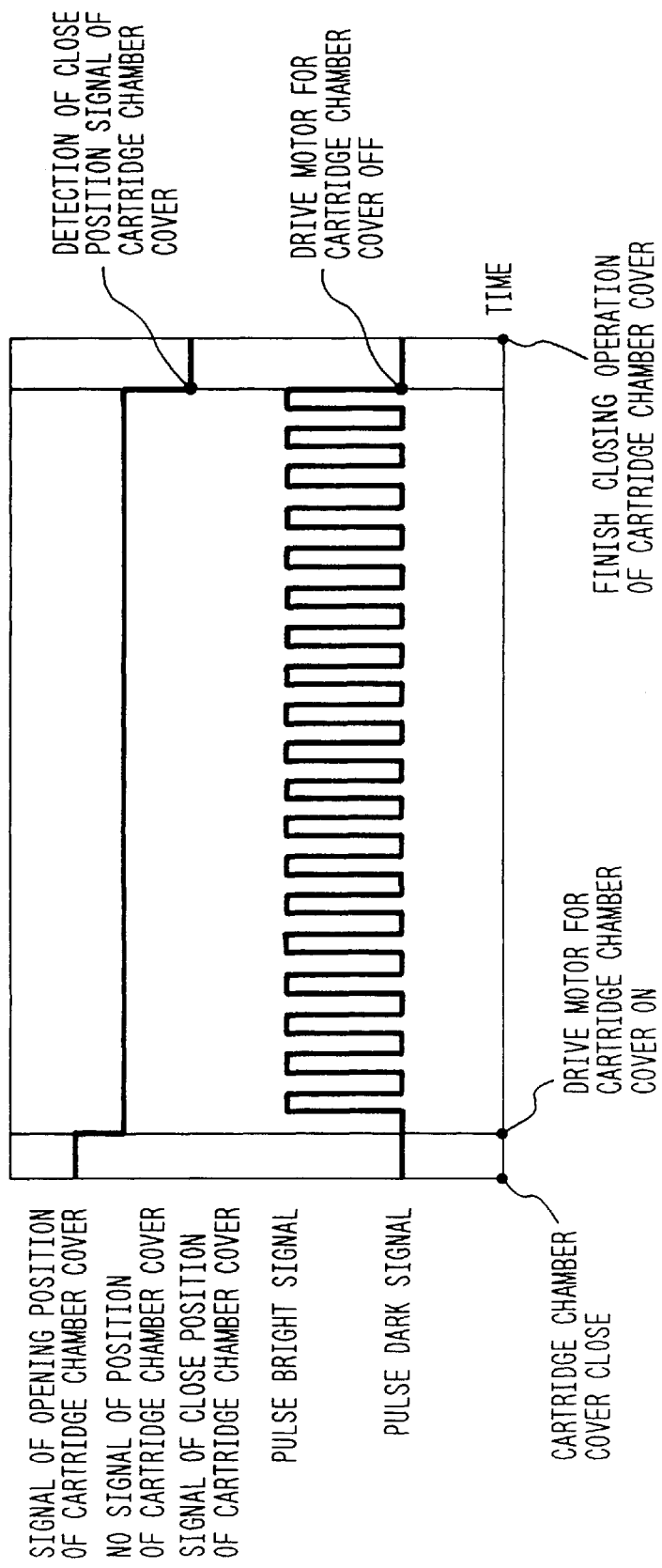

CAMERA ADAPTED TO USE A FILM CARTRIDGE HAVING A MOVABLE LIGHT SHIELD DOOR

This application is a continuation of application Ser. No. 08/329,877 filed Oct. 27, 1994, now abandoned.

BACKGROUND OF THE INVENTION

1. Field of the Invention

The present invention relates to an improvement in a camera adapted to use a film cartridge having a movable light shield door.

2. Description of the Related Art

Conventionally, in most methods of loading a film cartridge in a camera, a rear cover 2 as shown in FIGS. 17A and 17B is opened backward from the camera, and a cartridge 17 is loaded in a cartridge chamber 18 which appears at the open portion. In this method, however, a camera user can see the interior of the camera from the open portion. This makes an inexperienced user anxious. Additionally, since the method of loading a cartridge slightly changes for each camera, loading becomes complicated, or the hand position on the camera or the cartridge must be changed many times. For this reason, cartridge loading fails, or the camera user feels inconvenience in cartridge loading.

SUMMARY OF THE INVENTION

One aspect of the present invention is to provide a camera or apparatus adapted to use an image recording medium cartridge having a cover for allowing an image recording medium to exit from or withdraw into the image recording medium cartridge, or a device adapted in the camera or apparatus, which camera or apparatus comprises operation means for performing an operation related to at least one of loading and unloading of the cartridge with respect to the camera or apparatus, and determination means for determining an operation state of the operation means in accordance with a time, and in which at least one of the operation for loading the cartridge in the camera or apparatus and the operation for unloading the cartridge from the camera or apparatus can be easily and appropriately performed.

Other aspects of the present invention will become apparent from the following description of the preferred embodiments.

BRIEF DESCRIPTION OF THE DRAWINGS

FIG. 5 is a flow chart showing a subroutine for driving for closing the cartridge chamber cover of the camera in FIG. 1;

FIGS. 16A and 16B are views showing detection of a carrying speed of the cartridge chamber cover of the camera in FIG. 10.

DETAILED DESCRIPTION OF THE PREFERRED EMBODIMENTS

The preferred embodiments of the present invention will be described below with reference to the accompanying drawings.

Figure 1:
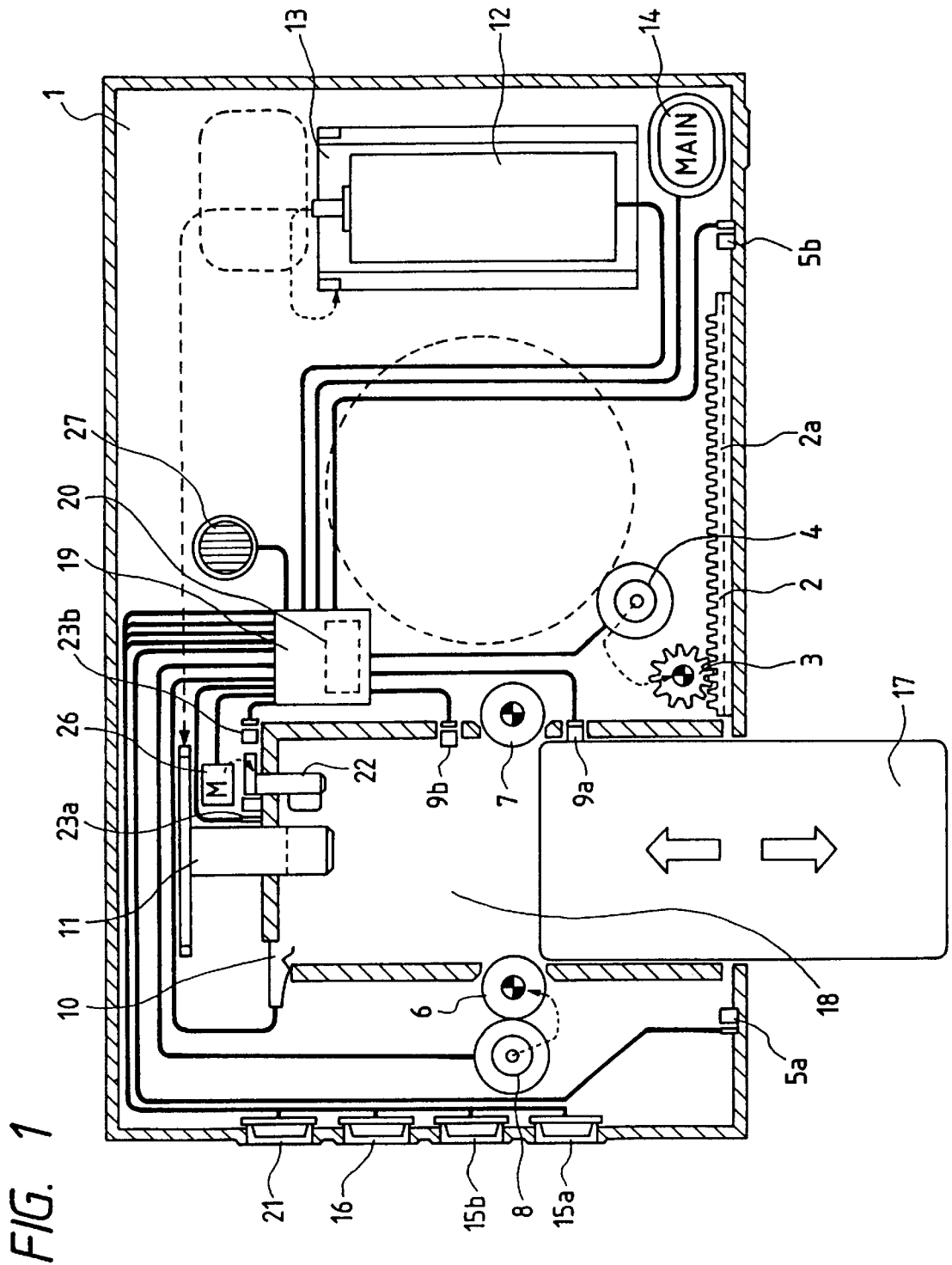
FIG. 1 is a sectional view showing a camera according to the first embodiment of the present invention.

FIG. 1 is a sectional view showing a camera constituting the first embodiment of the present invention. Referring to FIG. 1, the camera includes a camera main body 1, a cartridge chamber cover 2, having a rack portion 2a, for opening/closing a cartridge chamber 18, a gear array 3, engaged with the rack portion 2a, for transmitting a power to the cartridge chamber cover 2, a motor 4 for transmitting a power to the cartridge chamber cover, a detection switch 5a for a finish of closing the cartridge chamber cover, a detection switch 5b for a finish of opening the cartridge chamber cover, a gear 6 having an elastic roller portion for carrying a cartridge, a subsidiary roller 7 free to rotate to carry the cartridge, a motor 8 having a gear for transmitting a power to the gear 6, a detection switch 9a for a start of bringing in the cartridge, a detection switch 9b for a finish of pushing out the cartridge, a detection switch 10 for completion of loading the cartridge, a fork gear 11 engaged with a spool in the cartridge and having a fork portion for driving a film, and a motor 12 for applying a power to the film feed mechanism of the camera and dividing the power to the fork gear 11 through a gear array (not shown) and a spool gear 13 having a spool portion. The camera also includes a main switch 14, a cartridge chamber cover open switch 15a, a cartridge chamber cover close switch 15b, a film forcible rewind switch 16, a cartridge 17, the cartridge chamber 18, a microcomputer ($\mu$-com.) 19 for controlling the movement of the camera, a time control circuit 20 incorporated in the $\mu$-com., a cartridge eject switch 21, a driver for opening/closing a door for light-shielding a film in/out aperture formed in the cartridge, switches 23a and 23b for detecting the open/close position of the driver 22, a motor 26 for driving the driver 22, and a bell 27 for generating a warning tone.

Figure 18:
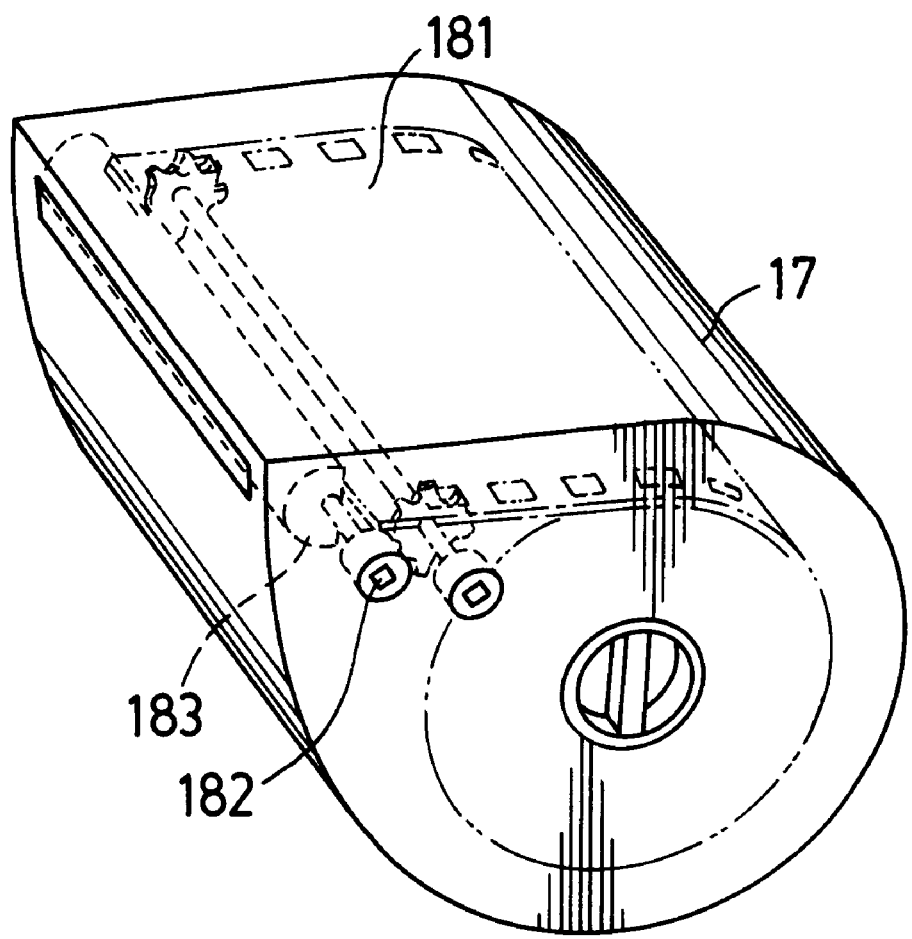
FIG. 18 is a side view of a conventional cartridge.

In the cartridge used in this embodiment, all the film 181 in an unexposed initial state is shielded from light and stored in the cartridge 17, as disclosed in Japanese Laid-Open Patent Application No. 3-75637 (see FIG. 18). If the film 181 is to be extracted from the cartridge 17, an operation portion 182 operated together with a film in/out aperture light shield door 183 in an interlocked manner must be driven to open the film in/out aperture light shield door. If a cartridge of a conventional type for light-shielding using a plush or the like arranged at the film in/out aperture is to be used, the driver 22, the driver position detection switches 23a and 23b, and the drive motor 26 for the driver are not needed, as a matter of course. In place of these elements, for example, a photoreflector provided to a film impression plate, or a magnetic detection head for a film having a magnetic layer need to be arranged to detect that the film is extracted from the cartridge.

The main operation of this embodiment will be described below. Referring to FIG. 1, when the cartridge chamber cover 2 is to be opened in a state wherein the cartridge 17 is not loaded in the cartridge chamber 18, the cartridge chamber cover open switch 15a is depressed, and this operation is transmitted to the µ-com. 19. The µ-com. 19 energizes the drive motor 4 for the cartridge chamber cover to drive the cartridge chamber cover 2 from a closing position to an opening position through the gear array 3. The end face of the cartridge chamber cover 2 depresses the detection switch 5b for the finish of opening the cartridge chamber cover. This operation is transmitted to the µ-com. 19 to stop the motor 4. When the cartridge 17 is brought in the cartridge chamber 18 in an open state of the cartridge chamber 18, the detection switch 9a for the start of bringing in the cartridge is depressed, and the operation is transmitted to the µ-com. 19.

The carrying motor 8 for the cartridge starts to drive for bringing in the cartridge, and the roller 6 starts to rotate. When the cartridge 17 is brought in the cartridge chamber 18, the side surface of the cartridge is sandwiched between the rollers 6 and 7. In accordance with the rotating force of the roller 6, the cartridge 17 is brought into the camera. When the cartridge 17 is further brought into the camera, one end of the spool in the cartridge 17 is completely engaged with the fork gear 11, and the operation portion for the cartridge film in/out aperture light shield cover is completely engaged with the driver 22. The end face of the cartridge 17 depresses the cartridge loading completion detection switch 10, and this operation is transmitted to the µ-com. 19, thereby stopping the carrying motor 8 for the cartridge. At this time, the cartridge chamber cover 2 is closed automatically or using the cartridge chamber cover close switch 15b. More specifically, the motor 4 is reversely energized by the µ-com. 19 to start drive for closing the cartridge chamber cover 2. Thereafter, when the detection switch 5a for the finish of closing the cartridge chamber cover is depressed, energization of the motor 4 is stopped by the µ-com. 19. With this operation, the loaded cartridge is set in a light shield state in the camera. At this time, the driver motor 26 starts drive for opening the film in/out aperture light shield door by the µ-com. 19. When the driver 22 is rotated, and the driver open position detection switch 23a is depressed, the motor 26 is stopped by the µ-com. 19.

Subsequently, the film feed motor 12 is driven to wind the film by the µ-com. 19. The spool in the cartridge 17, which is rotatably engaged with the fork gear 11, is rotated by a feed gear (not shown) to thrust-feed the film from the film in/out aperture of the film cartridge 17. The film passing between an aperture and a press plate (neither are shown) is taken up by the spool 12 and fed to a phototaking position.

An operation for opening the cartridge chamber cover in cartridge loading will be described below. The cartridge chamber cover open switch 15a is depressed, and the operation is transmitted to the µ-com. 19. After it is confirmed by the detection switch 23b that, upon completion of film rewinding, the driver 22 closes the film in/out aperture light shield door of the cartridge 17 to set the cartridge 17 in a light shield state, the µ-com. 19 energizes the drive motor 4 for the cartridge chamber cover to move the cartridge chamber cover 2 from the closing position to the opening position. When the end portion of the cartridge chamber cover 2 depresses the detection switch 5b for the finish of opening the cartridge chamber cover, this operation is transmitted to the µ-com. 19 to stop the motor 4. When the cartridge eject switch 21 is depressed, the carrying motor 8 for the cartridge is energized in a direction to push out the cartridge. When the cartridge 17 is disengaged from the fork gear 11 and the driver 22 and moved to a position not to depress the detection switch 9b for the finish of pushing out the cartridge, the operation is transmitted to the µ-com. 19 to stop energization of the motor 8. At this time, since the insertion portion of the cartridge 17 is stopped while being kept sandwiched between the rollers 6 and 7, the cartridge 17 is prevented from being ejected by the elastic forces of the rollers 6 and 7.

In addition, the surface friction of the cartridge 17 is so strong as to prevent the cartridge 17 from dropping from a reversed camera. For this reason, the cartridge 17 sandwiched between the two rollers 6 and 7 can be easily unloaded from the cartridge chamber by a human force. Upon unloading the cartridge 17, the detection switch 9a for the start of bringing in the cartridge is not depressed anymore. When this operation is detected by the µ-com. 19, or the cartridge chamber cover close switch 15b is depressed, the motor 4 is driven to automatically drive for closing the cartridge chamber cover 2.

When the end portion of the cartridge chamber cover 2 depresses the detection switch 5a for the finish of closing the cartridge chamber cover, the µ-com. 19 stops energization of the motor 4.

Figure 2:
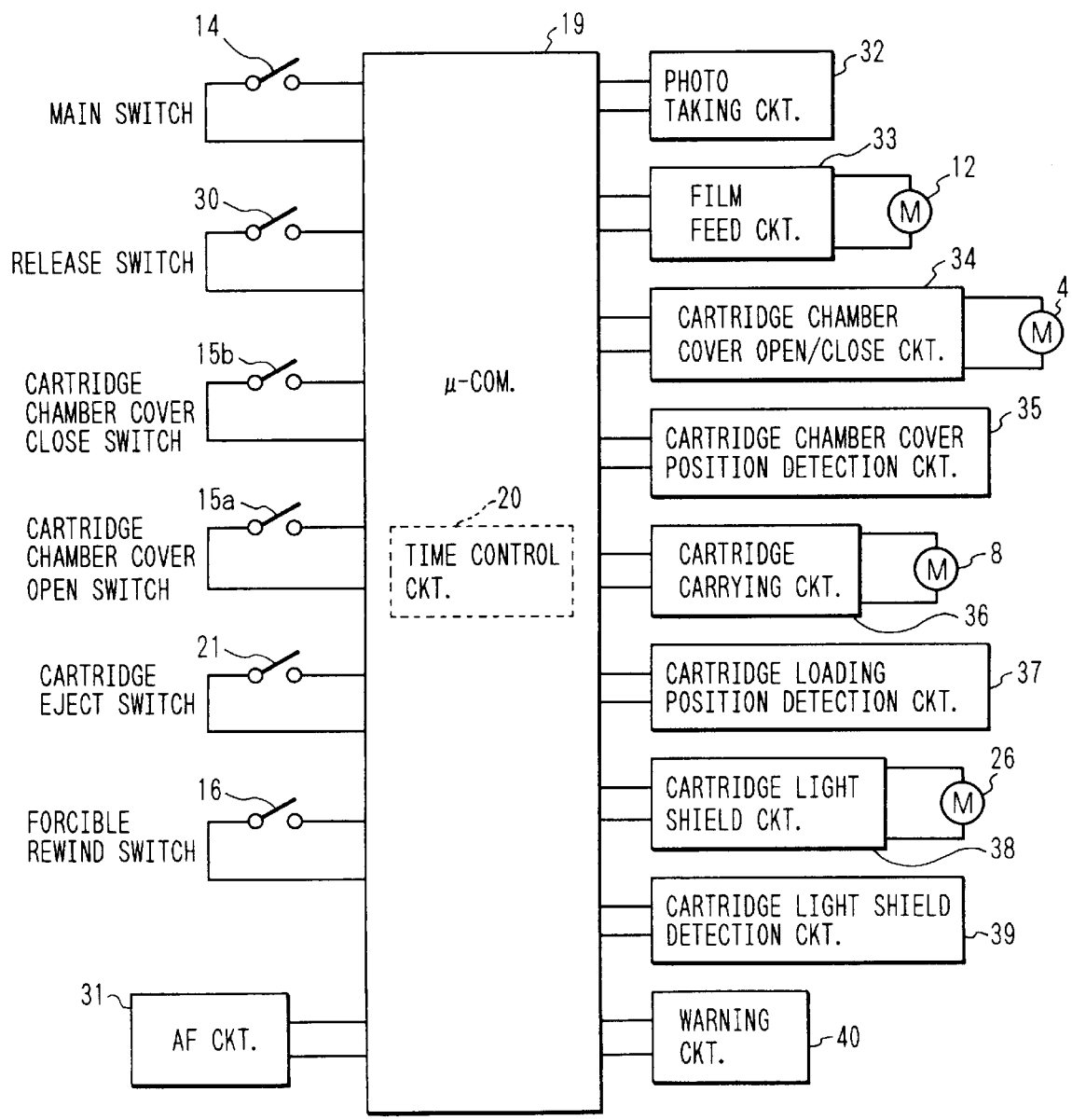
FIG. 2 is a block diagram showing the circuit of the camera in FIG. 1.

FIG. 2 is a block diagram showing the circuit of the camera in FIG. 1. The µ-com. 19 controls the camera and also incorporates the time control circuit 20. The circuit includes the main switch 14, a release switch 30 used for phototaking, the cartridge chamber cover close switch 15b, the cartridge chamber cover open switch 15a, the cartridge eject switch 21, the film forcible rewind switch 16, and an AF circuit 31 which is not needed for a fixed focus. The circuit also includes a phototaking circuit 32 for driving for extending a phototaking lens, and performing electronic flash light emission, AE, shutter stop drive, and the like, a film feed circuit 33 for driving the motor 12 for automatically winding/rewinding the film, and a cartridge chamber cover open/close circuit 34 for driving the motor 4 for opening/closing the cartridge chamber cover 2. Although a slide cover is used in FIG. 1, the type of the cover is not limited to this.

A cartridge chamber cover position detection circuit 35 including the detection switches 5a and 5b detects whether the cartridge chamber cover is located at an opening or closing position. A cartridge carrying circuit 36 drives the motor 8 for bringing in/pushing out the cartridge sandwiched between the rollers 6 and 7 in/from the camera. A cartridge loading position detection circuit 37 including the detection switches 9a, 10, and 9b detects the finish of bringing in, loading, and pushing out the cartridge. A cartridge light shield circuit 38 drives the motor 26 for opening/ closing the film in/out aperture light shield door of the cartridge. If the film wound in the cartridge can be shielded from light by not the film in/out aperture light shield door but a plush or the like, the cartridge light shield circuit 38 is not needed. A cartridge light shield detection circuit 39 including the detection switches 23a and 23b detects the opening/closing position of the cartridge light shield door. A warning circuit 40 including the bell 27 warns a camera user with sound, light, display, or the like.

The main sequence for depressing the cartridge chamber cover open switch 15a having the above structure will be described below with reference to the flow chart of the $\mu$-com. 19 shown in FIGS. 3A and 3B. The main switch 14 is turned on (S300) to start the $\mu$-com. 19 (S301). Thereafter, the cartridge chamber cover open switch 15a is depressed, and the operation is transmitted to the $\mu$-com. 19 (S302). S302 may be replaced with S300 such that the $\mu$-com. 19 is started upon depressing the cartridge chamber cover open switch 15a. To confirm whether a cartridge is present in the camera, a finish of loading the cartridge is detected by the detection switch 10 for the completion of loading the cartridge of the cartridge loading position detection circuit 37 (S303). The flow branches to a case wherein the cartridge is present and a case wherein the cartridge is not present.

If the cartridge 17 is not present, the flow immediately advances to a subroutine (to be described later) for driving for opening the cartridge chamber cover 2, and drive for opening the cartridge chamber cover 2 is started (S304). If drive for opening the cartridge chamber cover is completed, the flow branches to 4b. If the cartridge chamber cover 2 is stopped due to some trouble during drive for opening, the flow branches to 4c. When the cartridge 17 is not present in the camera in an initial state, and the cartridge chamber cover 2 is opened, a cartridge is assumed to be loaded from outside. For this reason, if opening of the cartridge chamber cover 2 is completed (4b), the flow immediately advances to a subroutine for driving for bringing in the cartridge 17, and drive for bringing the cartridge 17 in the cartridge chamber 18 is started (S305). If the cartridge is not loaded, or the cartridge is completely loaded (S305:6c), or if the cartridge chamber cover 2 cannot be opened due to some trouble in S340 (S304:4c), the flow advances to a subroutine for driving for closing the cartridge chamber cover 2 (S306) to prevent the cartridge chamber cover 2 from being left open, and drive for closing the cartridge chamber cover 2 is performed. If closing of the cartridge chamber cover 2 is completed, drive for opening the film in/out aperture light shield door of the cartridge 17 is performed by the cartridge light shield circuit 38 (S307). The film in the cartridge 17 is fed to a phototaking position by the film feed circuit 33 (S308). On the other hand, if the cartridge 17 is loaded, and the cartridge 17 is stopped during drive for bringing in in S305 (S305:6b), or if drive for closing the cartridge chamber cover 2 is incompletely stopped in S306 (S306:5c), the main sequence in FIG. 3B is finished (S318).

If the cartridge 17 is present in the cartridge chamber 18 in S303 (S303:YES), the cartridge light shield detection circuit 39 detects whether the film is completely rewound in the cartridge 17 upon automatic rewinding after phototaking of all frames or forcible rewinding by the forcible rewind switch 16, and the light shield door of the film in/out aperture is closed to set the cartridge 17 in a light shield state. If light shield of the cartridge 17 is completed (S309:YES), the flow advances to a subroutine (to be described later) for driving for opening the cartridge chamber cover, and drive for opening the cartridge chamber cover 2 is performed (S310). If light shield of the cartridge 17 is not completed (S309:NO), the film is exposed upon opening the cartridge chamber cover 2. For this reason, the operation for opening the cartridge chamber cover 2 is not performed. If opening of the cartridge chamber cover 2 is completed in S310, the flow branches to 4b. If the cartridge chamber cover 2 is stopped during opening, the flow branches to 4c. When the cartridge 17 is present in the camera in the initial state, and the cartridge chamber cover 2 is opened, it is assumed that the cartridge loading state is to be confirmed, or the cartridge is pushed out and exchanged for a new cartridge. For this reason, a timer $T_1$ in the $\mu$-com. 19 is started (S311) to wait for only $T_0$ second period until the cartridge eject switch 21 is depressed from outside (S313). If the cartridge eject switch 21 is depressed within $T_0$ second period (S312:YES), the timer $T_1$ is reset (S315). The flow advances to a subroutine (to be described later) for driving for pushing out the cartridge, and drive for pushing out the cartridge 17 from the cartridge chamber 18 is started (S316). The eject switch 21 cannot be depressed except when the cartridge chamber cover 2 is completely opened. If pushing out of the cartridge 17 is completed in S316, and the cartridge 17 is unloaded from the cartridge chamber 18, or the cartridge 17 is completely loaded in the cartridge chamber 18 again as described later (S316:7b), or if the cartridge chamber cover 2 is stopped during drive for opening in S310 (S310:4c), or if the cartridge eject switch 21 is not depressed within $T_0$ second period although the cartridge chamber 18 is opened in S313, the flow advances to a subroutine (to be described later) for driving for closing the cartridge chamber cover, and drive for closing the cartridge chamber cover 2 is started to prevent the cartridge chamber 18 from being left open (S317). A state wherein the drive for closing is completed is determined in S317:5b. A state wherein the drive for closing is incompletely stopped due to some trouble is determined in S317:5c.

A state wherein the cartridge chamber cover 2 is completely closed is determined in S308 or S317:5b. A state wherein the cartridge 17 is left inserted, and the cartridge chamber cover 2 is open is determined in S305:6b or S316:7c. A state wherein the cartridge chamber cover is stopped at an incompletely closing position is determined in S306:5c or S317:5c.

Figure 3A:
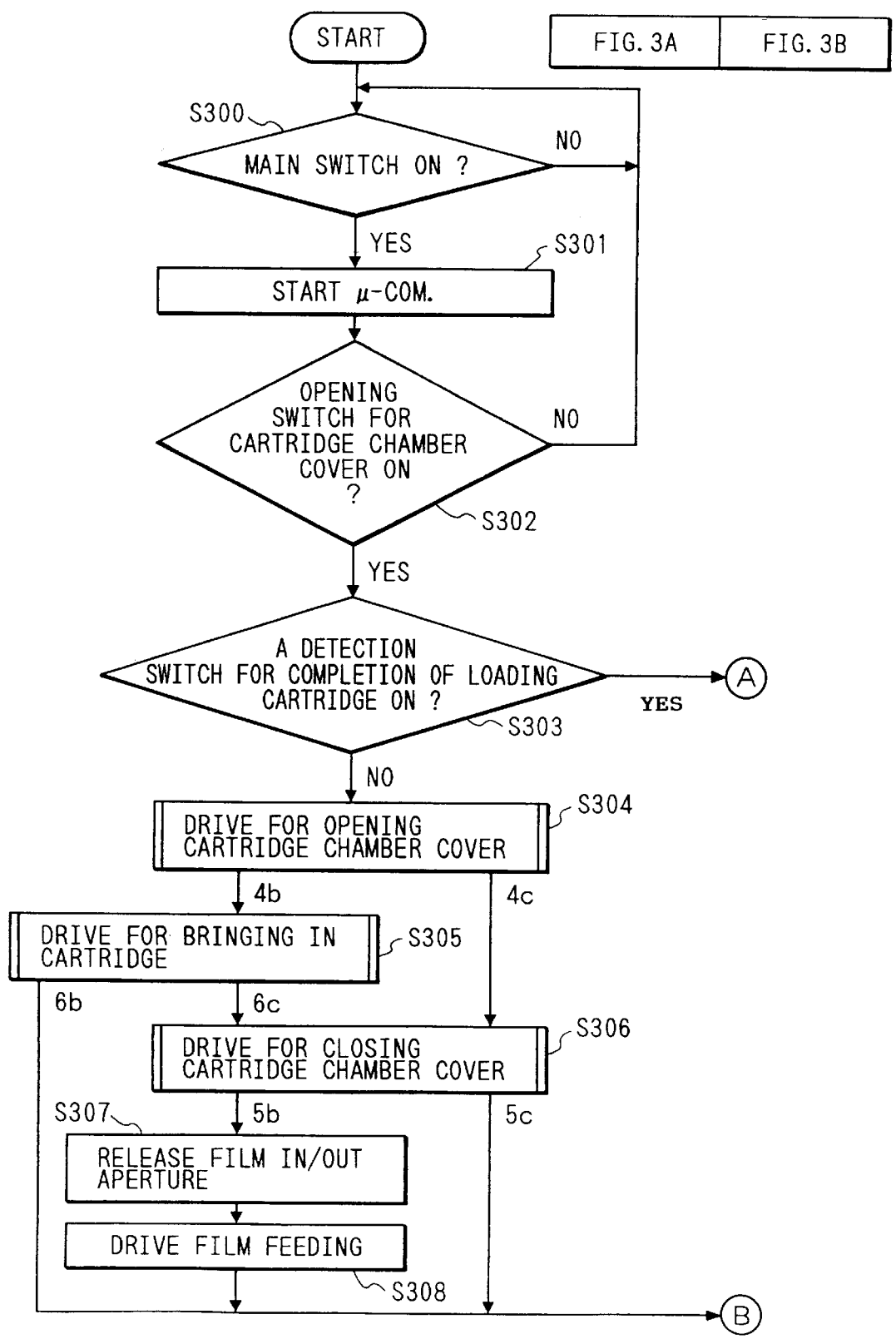
FIG. 3 is comprised of FIGS. 3A and 3B illustrating in flow charts showing the main sequence for depressing a cartridge chamber cover open switch of the camera in FIG. 1.
Figure 3B:
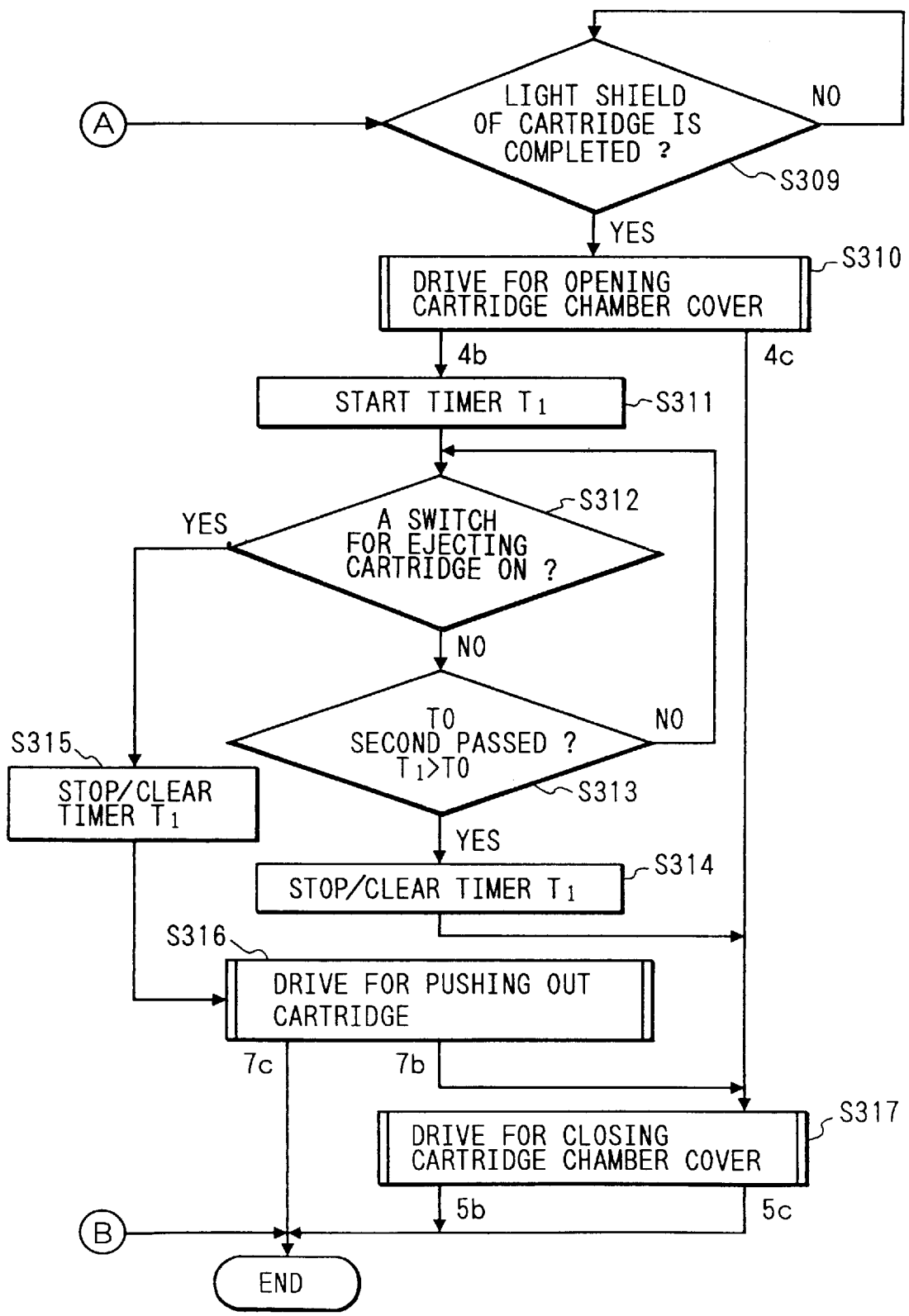

When the sequence for driving for opening the cartridge chamber shown in FIGS. 3A and 3B is used, and drive for opening/closing the cartridge chamber cover 2 or drive for carrying the cartridge 17 is performed without any trouble, an operation from opening to light shield of the cartridge chamber 18 can be performed without using the cartridge chamber cover close switch 15b.

The main sequence for depressing the cartridge chamber cover close switch 15b will be described below with reference to the flow chart of the $\mu$-com. 19 shown in FIG. 8. This sequence is used when the cartridge chamber is left open due to some trouble during the sequence for opening the cartridge chamber cover shown in FIGS. 3A and 3B, or when the cartridge chamber cover is to be forcibly closed during the sequence. The main switch 14 is turned on (S800) to start the $\mu$-com. 19 (S801). The cartridge chamber cover close switch 15b is depressed, and this operation is transmitted to the $\mu$-com. 19 (S802). S802 may be replaced with S800 such that the $\mu$-com. 19 is started upon depressing the cartridge chamber cover close switch 15b.

Regardless of the state of the cartridge chamber cover 2, the flow advances to a subroutine (to be described later) for driving for closing the cartridge chamber cover 2, and drive for closing the cartridge chamber cover 2 is started (S803). With this operation, a state wherein the drive for closing the cartridge chamber cover 2 is completed is determined in S803:5b. A state wherein the drive is not completed is determined in S803:5c. If the drive is completed, the detection switch 10 for the completion of loading the cartridge of the cartridge loading position detection circuit 37 performs detection to confirm whether the cartridge 17 is completely loaded in the camera or not present at all (S804). If the cartridge 17 is present (S804:YES), the film in/out aperture light shield door of the cartridge 17 is released by the cartridge light shield circuit 26 (S805). The film is fed to the phototaking position by the film feed circuit 33 (S806).

In S803, if the cartridge chamber cover 2 is completely closed, and the cartridge 17 is not present in the camera (S804:NO), the operation is finished. In S803, if the cartridge chamber cover 2 is not completely closed during drive for closing (S803:5c), the flow advances to a subroutine for driving for opening the cartridge chamber cover, and drive for opening the cartridge chamber cover 2 is performed (S809). Regardless of completion or incompletion of the drive, the main sequence in FIG. 8 is finished.

Figure 8:
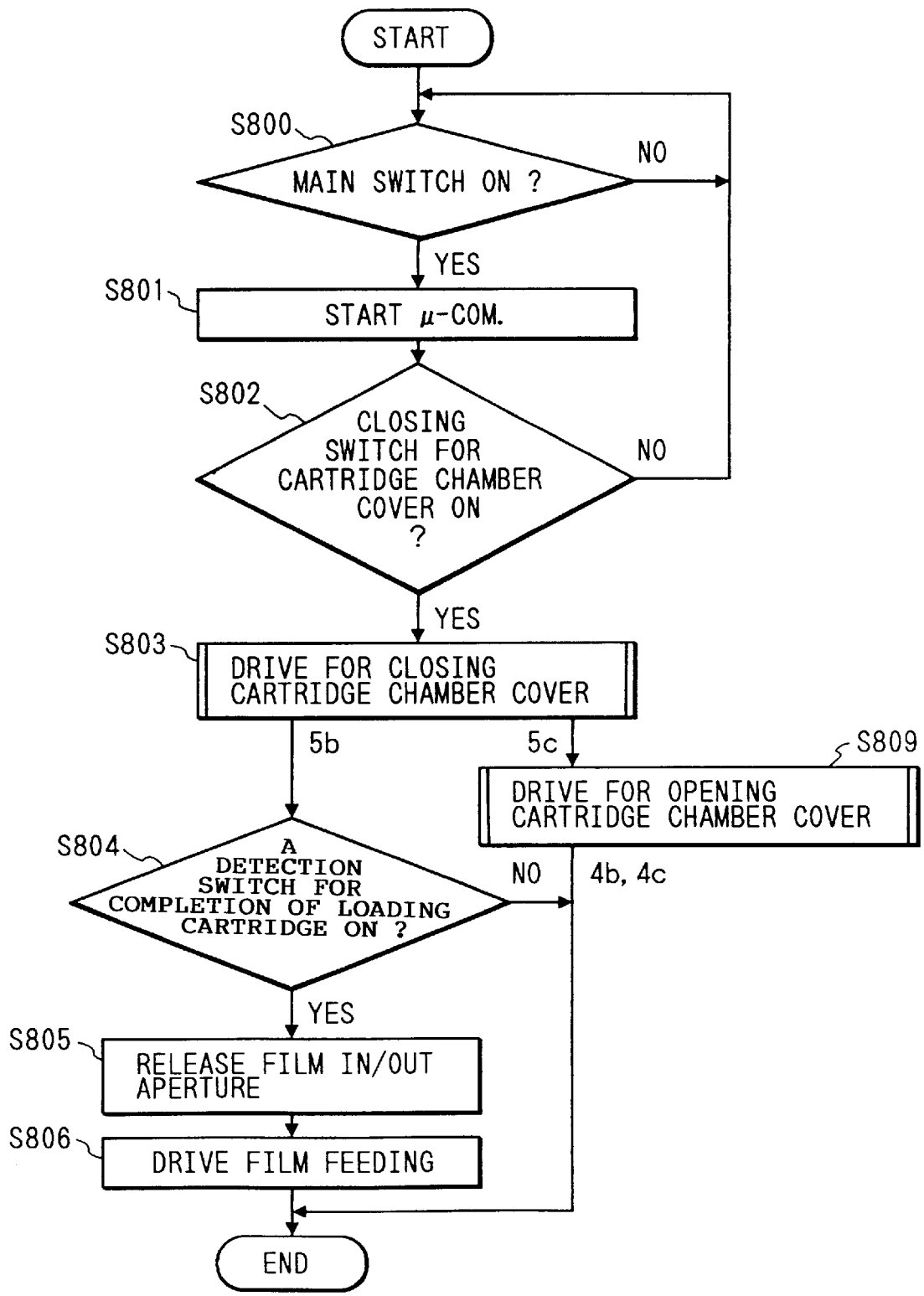
FIG. 8 is a flow chart showing the main sequence for depressing a cartridge chamber close switch of the camera in FIG. 1.

The flow charts in FIGS. 3A, 3B and 8 show the main sequences for depressing the cartridge chamber cover open switch 15a and the cartridge chamber cover close switch 15b.

Figure 4:
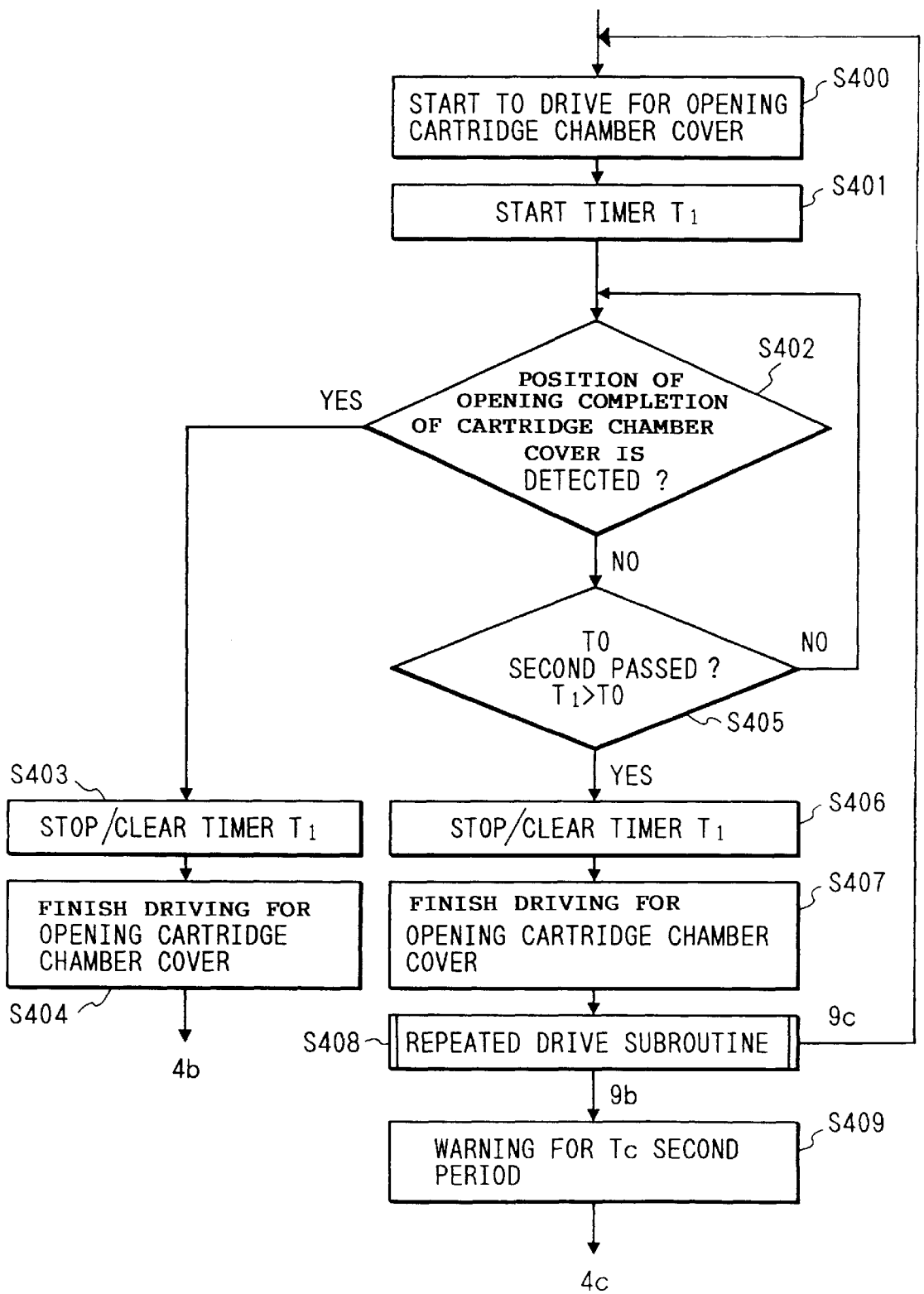
FIG. 4 is a flow chart showing a subroutine for driving for opening a cartridge chamber cover of the camera in FIG. 1.

The subroutines for actually driving for opening or closing the cartridge chamber cover in the main sequences for depressing the cartridge chamber cover open switch 15a or the close switch 15b and driving for bringing in or pushing out the cartridge, and a subroutine for repeated drive performed when the operation is not completed will be described. FIG. 4 shows the subroutine for driving for opening the cartridge chamber cover, which is shown in S304 and S310 of FIG. 3B and S809 of FIG. 8. The drive motor 4 for the cartridge chamber cover is driven by the cartridge chamber cover open/close circuit 33 (S400). The timer $T_1$ in the $\mu$-com. 19 is started to count a predetermined time of $T_0$ second period substantial for movement from the completion position of the cartridge closed to the completion position of the cartridge open without any trouble (S401). If a finish of opening the cartridge chamber cover 2 is not detected by the cartridge chamber cover position detection circuit 35 within the $T_0$ second period, it is determined that the cartridge chamber cover 2 is not moved due to some trouble. In this case, the timer $T_1$ serves as a trouble detecting means. Until the timer $T_1$ counts the $T_0$ second period (S405), a finish of opening the cartridge chamber cover 2 is repeatedly detected (S402). If opening of the cartridge chamber cover 2 is completed until the $T_0$ second period is counted (S402:YES), the timer $T_1$ is reset (S403). The drive for opening the cartridge chamber cover 2 is finished (S404), and the flow is ended (4b).

If a finish of opening the cartridge chamber cover 2 is not detected until the $T_0$ second period is counted (S405:YES), the timer $T_1$ is reset (S406). The drive for opening the cartridge chamber cover is temporarily stopped (S407). The flow advances to the repeated drive subroutine (to be described later) for driving for opening the cartridge chamber cover 2 again (S408). If the repeated drive subroutine is performed a predetermined number of times (S408:9c), and the cartridge chamber cover is not completely opened yet (S408:9b), the camera user is warned by the warning circuit 40 with sound, a liquid crystal display, flickering light, or the like for $T_C$ second period that the operation for opening the cartridge chamber cover is not completed (S409), and the flow is ended (4c). With the repeated drive subroutine, if the cartridge chamber cover 2 is completely opened (from S408:9c to S402:YES), the flow branches to 4b, as described above.

FIG. 5 shows the subroutine for driving for closing the cartridge chamber cover, which is shown in S306 and S317 of FIGS. 3A and 3B and S803 of FIG. 8. The drive motor 4 for the cartridge chamber cover is driven by the cartridge chamber cover open/close circuit 33 (S500). A timer $T_2$ in the $\mu$-com. 19 is started to count the predetermined time of $T_0$ second period substantial for movement from the completion position of the cartridge open to the completion position of the cartridge closed without any trouble (S501). If a finish of closing the cartridge chamber cover is not detected by the cartridge chamber cover position detection circuit 35 within the $T_0$ second period, it is determined that the cartridge chamber cover 2 is not moved due to some trouble such that a finger or the like is brought into the cartridge insertion opening by the cartridge chamber cover 2. In this case, the timer $T_2$ also serves as a means for detecting a foreign substance brought into the cartridge chamber 18. A finish of closing the cartridge chamber cover 2 is repeatedly detected (S502) until the timer $T_2$ counts the $T_0$ second period (S505). If closing of the cartridge chamber cover 2 is completed until the $T_0$ second period is counted (S502:YES), the timer $T_2$ is reset (S503). The drive for closing the cartridge chamber cover is finished (S504), and the flow is ended (5b).

If a finish of closing the cartridge chamber cover 2 is not detected within the $T_0$ second period (S505:YES), the timer $T_2$ is reset (S506). The drive for closing the cartridge chamber cover is temporarily stopped (S507), and the flow advances to the repeated drive subroutine (to be described later) for driving for closing the cartridge chamber cover 2 again (S508:9a). If the repeated drive subroutine is performed a predetermined number of times (S508:9c), and the cartridge chamber cover is not completely closed yet (S508:9b), the camera user is warned by the warning circuit 40 with sound, a liquid crystal display, flickering light, or the like for the $T_C$ second period that the operation for closing the cartridge chamber cover is not completed (S509), and the flow is ended (5c). With the repeated drive subroutine, if closing of the cartridge chamber cover 2 is completed (from S508:9c to S502:YES), the flow branches to 5b, as described above.

Figure 6B:
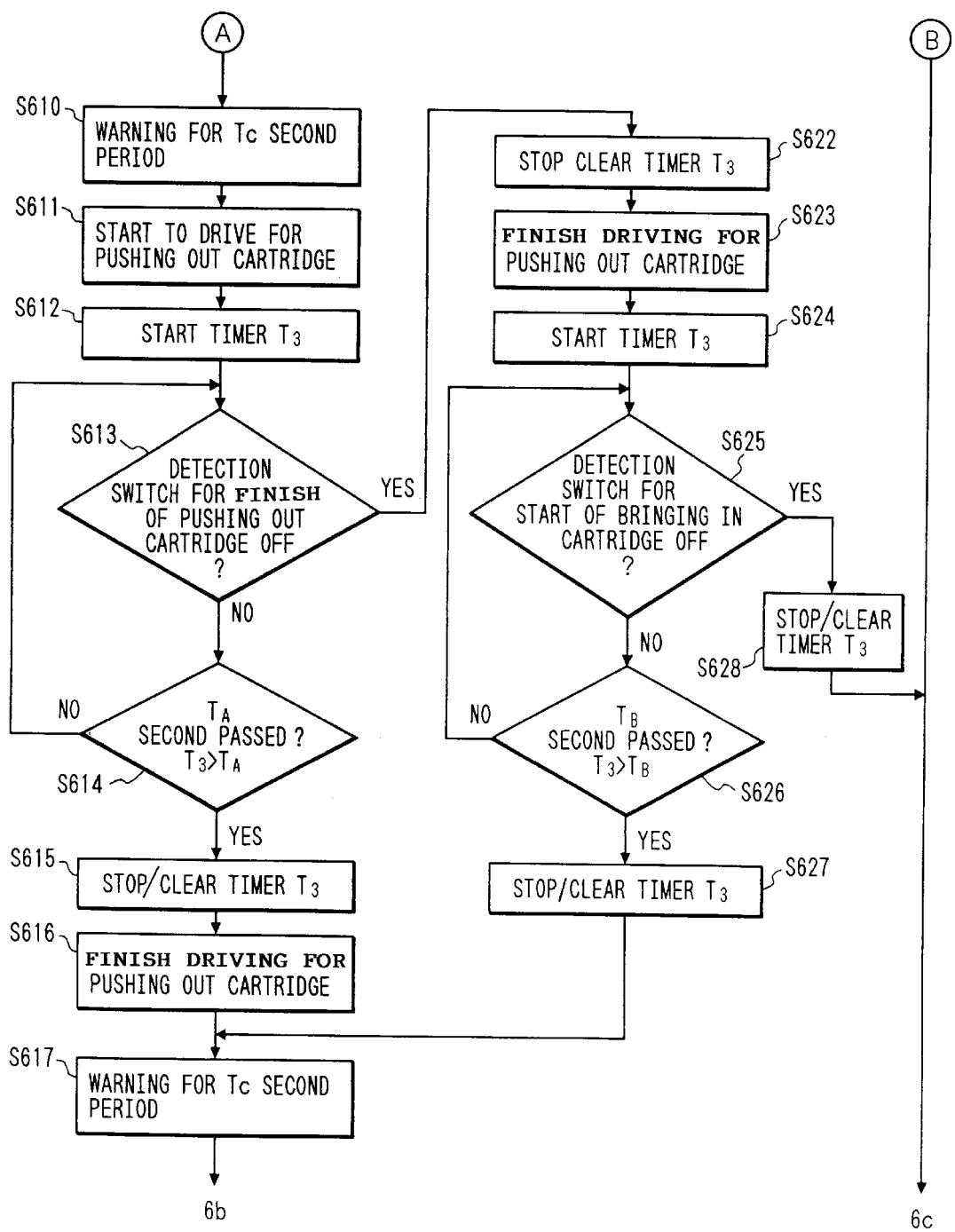
FIG. 6 is comprised of FIGS. 6A and 6B illustrating in flow charts showing a subroutine for driving for bringing in a cartridge in the camera in FIG. 1.

FIGS. 6A and 6B show the subroutine for driving for bringing in the cartridge, which is shown in S305 of FIG. 3A. A timer $T_3$ in the $\mu$-com. 19 is started to count a cartridge loading wait limit time of $T_A$ second period (S600). If bringing in of the cartridge 17 in the cartridge chamber 18 is not detected by the detection switch 9a for the start of bringing in the cartridge of the cartridge loading position detection circuit 37 within the $T_A$ second period, it is determined that the camera user does not intend to load the cartridge 17 (S601:NO, S618:YES). The timer $T_3$ is reset (S619), and the flow is ended (6c). If bringing in of the cartridge is detected within the $T_A$ second period (S601:YES), the timer $T_3$ is reset (S602). The drive motor 8 for bringing in the cartridge is driven by the cartridge carrying circuit 36 (S603) to drive the cartridge carrying roller 6 to bring in the cartridge. At the same time, the timer $T_3$ in the $\mu$-com. 19 is started to count a predetermined time of $T_B$ second period substantial to completely load the cartridge from the bringing in position (S604). Until the cartridge bringing in wait time of $T_B$ second period is counted (S606), the detection switch 10 for loading the cartridge of the cartridge loading position detection circuit 37 repeatedly detects whether the cartridge 17 is sandwiched between the bringing in rollers 6 and 7, brought in by the rotating force of the roller 6, and completely loaded (S605). If a finish of loading the cartridge 17 is detected within the $T_B$ second period (S605:YES), the timer $T_3$ is reset (S620). The drive for bringing in the cartridge is finished (S621), and the flow is ended (6c).

On the other hand, if loading of the cartridge 17 is not detected within the $T_B$ second period (S606:YES), the timer $T_3$ is reset (S607). The drive for bringing in the cartridge is temporarily stopped (S608), and the flow advances to the repeated drive subroutine (to be described later) for driving for bringing in the cartridge again (S609). If the repeated drive subroutine is performed a predetermined number of times (S609:9c), and loading of the cartridge is not completed yet (S609:9b), the camera user is warned by the warning circuit 40 with sound, a liquid crystal display, flickering light, or the like for the $T_C$ second period that the operation for bringing in the cartridge is not completed (S610). Thereafter, drive for pushing out the cartridge 17, which is assumed to be incompletely loaded, from the cartridge chamber 18 is started by the cartridge carrying circuit 36 (S611).

With the repeated drive subroutine, if loading of the cartridge is completed (from S609:9c to S605:YES), the flow branches to 6c, as described above.

On the other hand, drive for pushing out the cartridge which is assumed to incompletely loaded is started in S611. At the same time, the timer $T_3$ in the μ-com. is started to count the predetermined time of $T_A$ second period substantial to drive for pushing out the cartridge from the loading completion position to the pushing out completion position without any trouble (S612). A finish of pushing out the cartridge is repeatedly detected by the detection switch 9b for the finish of pushing out the cartridge of the cartridge loading position detection circuit 35 within the $T_A$ second period (S613). If a finish of pushing out is not detected within the $T_A$ second period, it is assumed that the cartridge 17 is left incompletely loaded in the cartridge chamber 18, and neither drive for bringing in nor drive for pushing out can be performed. The timer $T_3$ is reset in this state (S615), and the drive for pushing out the cartridge is stopped (S616). The camera user is warned by the warning circuit 40 with sound, display, light, or the like for the $T_C$ second period that the drive for bringing in the cartridge is not completed (S617), and the flow is ended (6b).

On the other hand, if the cartridge 17 is incompletely loaded and pushed out to a position where the cartridge can be manually unloaded although the cartridge 17 is loaded and brought in (S613:YES), the timer $T_3$ is reset (S622), and the drive for pushing out the cartridge is finished (S623). The timer $T_3$ starts to count the predetermined wait limit time of $T_B$ second period to unload the cartridge (S624). Until the timer $T_3$ counts the $T_B$ second period, the detection switch 9a for the start of bringing in the cartridge of the cartridge loading position detection circuit 37 repeatedly detects whether the cartridge 17 is unloaded (S625). If unloading is detected (S625:YES), the timer $T_3$ is reset (S628), and the flow is ended while the cartridge chamber 18 is empty and open (6c). If unloading is not detected (S626:YES), the timer $T_3$ is reset (S627). While the cartridge chamber cover 2 is left open in a state wherein the cartridge 17 can be manually unloaded from the cartridge chamber, the camera user is warned by the warning circuit 40 with sound, display, light, or the like for the $T_C$ second period that the drive for bringing in the cartridge is not completed, and the flow is ended (6b).

Figure 7B:
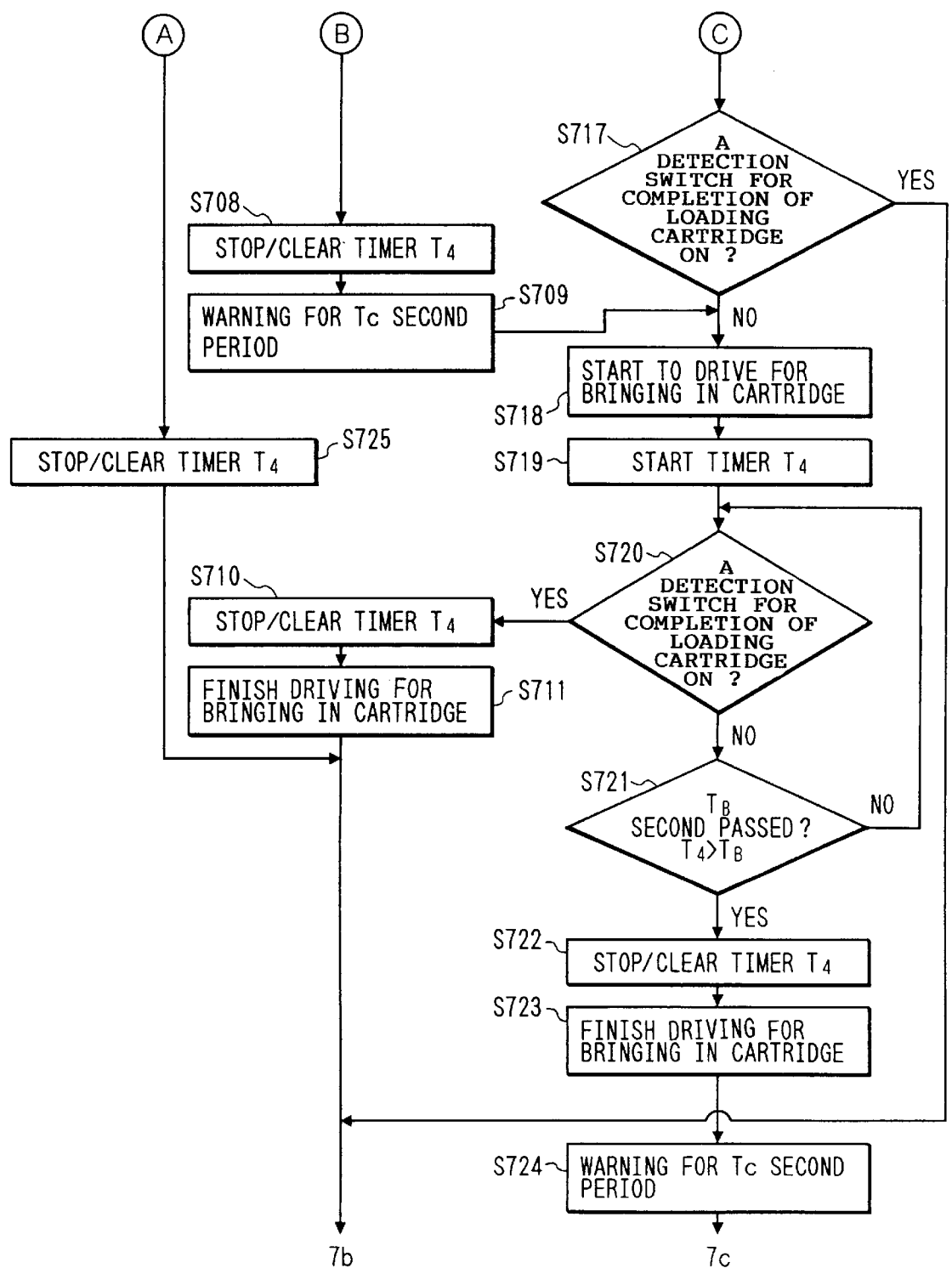
FIG. 7 is comprised of FIGS. 7A and 7B illustrating in flow charts showing a subroutine for driving for pushing out the cartridge from the camera in FIG. 1.

FIGS. 7A and 7B show the subroutine for driving for pushing out the cartridge, which is shown in S316 of FIG. 3B. The drive motor 8 for bringing in the cartridge is driven by the cartridge carrying circuit 36 (S700) to drive the cartridge carrying roller 6 to push out the cartridge. At the same time, a timer $T_4$ in the μ-com. 19 is started to count the predetermined time of $T_A$ second period substantial to drive for pushing out the cartridge from the loading completion position to the pushing out completion position without any trouble (S701). Until the timer $T_4$ counts the $T_A$ second period (S712), a finish of pushing out the cartridge is repeatedly detected by the detection switch 9b for the finish of pushing out the cartridge of the cartridge loading position detection circuit 37 (S702). If a finish of pushing out the cartridge is detected within the $T_A$ second period (S702:YES) even when the cartridge 17 is not loaded, the timer $T_4$ is reset (S703), and the drive for pushing out the cartridge is finished (S704).

To the contrary, if pushing out is not detected within the $T_A$ second period (S712:YES), the timer $T_4$ is reset (S713). The drive for pushing out the cartridge is temporarily stopped (S714), and the flow advances to the repeated drive subroutine (to be described later) for repeatedly performing the operation for pushing out (S715). If a finish of pushing out is detected (S702:YES) until the repeated drive subroutine is performed a predetermined number of times (S715:9c), the flow advances to the above-described S704. If the repeated drive subroutine is performed the predetermined number of times, and a finish of pushing out is not detected yet (S715:9b), the camera user is warned by the warning circuit 40 with sound, display, light, or the like for the $T_C$ second period that the drive for pushing out the cartridge is not completed (S716). The detection switch 10 for loading the cartridge of the cartridge loading position detection circuit 37 detects whether the cartridge 17 is not moved at all or it is somewhat pushed out (S717). If the cartridge 17 is not moved at all (S717:YES), the flow is ended (7b). If the cartridge 17 is somewhat pushed out (S717:NO), the operation for bringing in is performed again by the cartridge carrying circuit 36 (S718).

On the other hand, if pushing out of the cartridge 17 is completed, and the drive for pushing out the cartridge 17 is finished in S704, the timer $T_4$ starts to count the predetermined wait limit time of $T_B$ second period to unload the cartridge (S705). Until the predetermined time of $T_B$ second period is counted (S707), a finish of unloading the cartridge 17 is repeatedly detected by the detection switch 9a for the start of bringing in the cartridge of the cartridge loading position detection circuit 35 (S706). If a finish of unloading the cartridge is detected within the predetermined time of $T_B$ second period (S706:YES), the timer $T_4$ is reset (S725), and the flow is ended (7b).

If a finish of unloading is not detected within the predetermined time of $T_B$ second period (S707:YES), the timer $T_4$ is reset (S708). The camera user is warned by the warning circuit 40 with sound, display, light, or the like for the $T_C$ second period that the cartridge is left unremoved (S709), and the operation for bringing in the unremoved cartridge 17 into the camera is started. The drive motor 8 for bringing in the cartridge is driven by the cartridge carrying circuit 36 (S718) to drive the cartridge carrying roller 6 to bring in the cartridge. Since both S709 and S717:N0 are in a state wherein the cartridge 17 is sandwiched between the rollers 6 and 7, drive for bringing in is started from this state. At the same time, the timer $T_4$ starts to count the predetermined time of $T_B$ second period substantial for carrying from the cartridge bringing in position to the cartridge loading completion position without any trouble (S719). Until the predetermined time of $T_B$ second period is counted (S721), a finish of loading the cartridge is repeatedly detected by the detection switch 10 for loading the cartridge of the cartridge loading position detection circuit 37 (S720). If a finish of loading is detected within the predetermined time of $T_B$ second period (S720:YES), the timer $T_4$ is reset. The drive for bringing in the cartridge is finished, and the flow is ended (7b).

If a finish of loading is not detected within the predetermined time of $T_B$ second period (S721:YES), the timer $T_4$ is reset (S722), and the drive for bringing in the cartridge is immediately stopped (S723). The camera user is warned by the warning circuit 40 with sound, display, light, or the like for the $T_C$ second period that loading of the cartridge is not completed (S724), and the flow is ended (7c).

Figure 9:
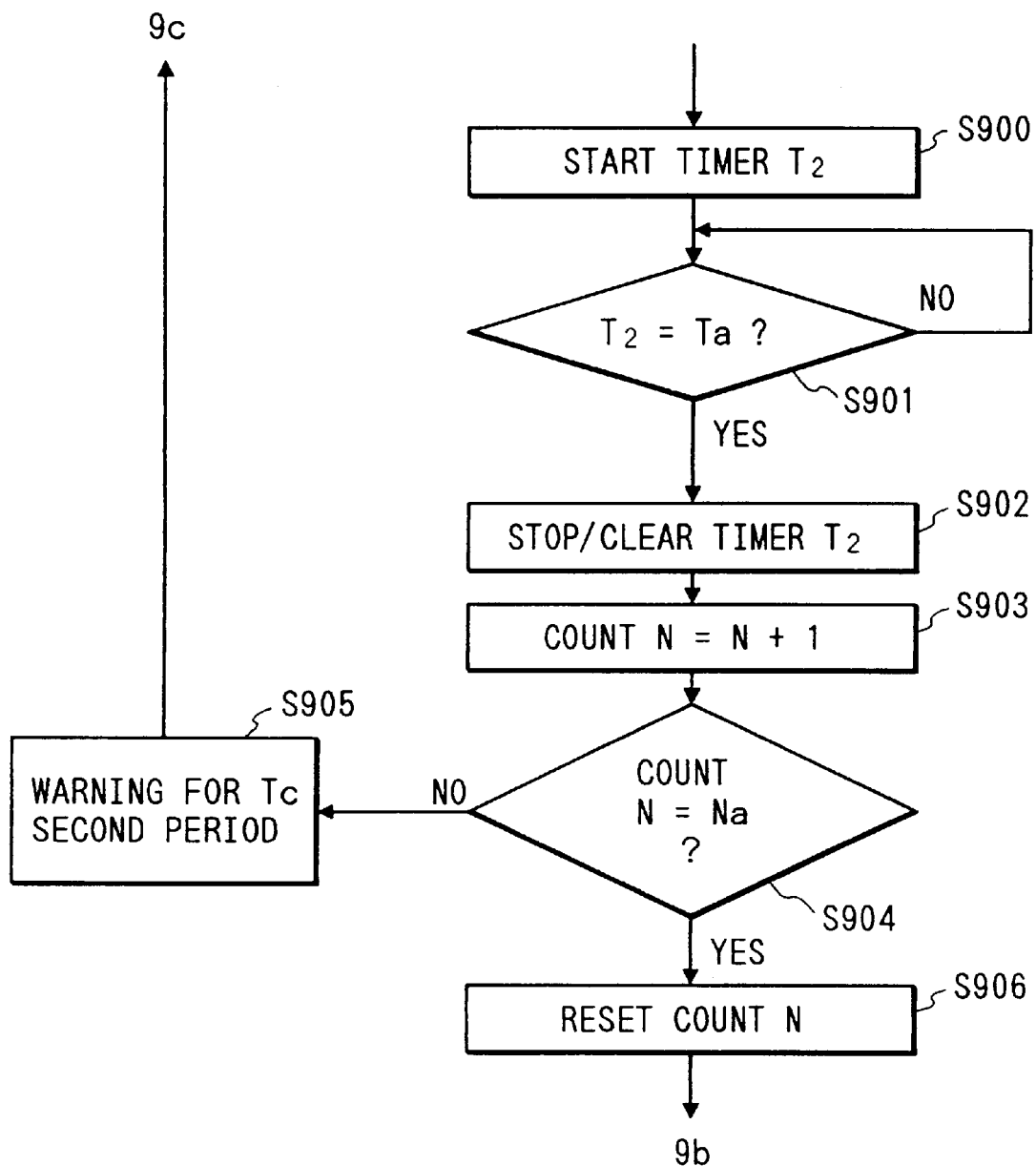
FIG. 9 is a flow chart showing a subroutine for repeatedly driving the camera in FIG. 1.

FIG. 9 shows the subroutine for performing repeated drive shown in S408 of FIG. 4, S508 of FIG. 5, S609 of FIG. 6A, and S715 of FIG. 7A. This repeated drive is set to automatically perform the same operation again when drive for opening/closing the cartridge chamber cover or drive for bringing in/pushing out the cartridge is incompletely finished, and is positioned as a step performed when the first desired drive is incompletely finished. When the desired drive is incompletely finished, the same drive is performed again. For this reason, after the desired drive is stopped, the timer $T_2$ is started (S900), and the desired drive is not performed for a predetermined pause time of $T_a$ second period. When the timer $T_2$ counts the set time of $T_a$ second period (S901), the timer $T_2$ is reset (S902) to start to count the number N of repetition times (S903). Until the number N of times reaches a predetermined number $N_a$ of times, the flow circulates through a loop for performing the same drive from the beginning (S904:NO).

To inform the camera user that the first desired drive is not completed, the warning circuit 40 warns with sound, display, light, or the like for the $T_C$ second period. Thereafter, the flow returns to the initial loop for the desired drive (S905), and the flow is ended (9c). If the desired drive is not completed until the number N of repetition times reaches the predetermined number $N_a$ of times (S904:YES), the count N is reset, and the flow is ended (9b). If the repetition operation is not needed in the subroutines in the main sequences of FIGS. 3A, 3B and 8, which are shown in FIGS. 4 to 7, the subroutine in FIG. 9 itself may be omitted. Alternatively, when $N_a$=1 is set as the set number of repetition times, the flow can advance to the next sequence without advancing to the repetition loop (S904:NO).

As described above, according to the first embodiment of the present invention, the following effects can be obtained.

(1) In the camera for electrically driving for opening/closing the cartridge chamber cover or driving for bringing in/pushing out the cartridge, troubles during each drive can be detected by only using the timer. Particularly, in drive for closing the cartridge chamber cover, the timer also serves as a "foreign substance insertion detecting means" for detecting that a finger or the like is inserted in the cartridge chamber. Additionally, since a trouble state is stopped in a short time, destruction of the internal mechanism is prevented.

(2) When drive for opening/closing the cartridge chamber cover or drive for bringing in/pushing out the cartridge is to be performed, and even if the desired drive fails once, the same drive can be repeatedly performed a plurality of times. In addition, a warning means is arranged to inform the camera user that the desired drive fails.

(3) When the desired drive for opening/closing the cartridge chamber cover or for bringing in/pushing out the cartridge is incompletely finished, a reverse operation is performed, thereby avoiding a trouble state and restoring the initial state.

(4) To prevent dust or the like from entering the cartridge chamber in the open state of the cartridge chamber cover, the timer and the like is used to immediately close the cartridge chamber cover within a set time or after a desired operation is finished.

In the first embodiment, the timer for detecting the trouble in drive for opening/closing the cartridge chamber cover or bringing in/pushing out the cartridge by an electrical power starts after the desired drive. However, the timer may start before the desired drive, as a matter of course. In addition, a time to be counted by each timer can be set to a desired time as needed, as a matter of course. The time control circuit 20 in FIG. 1 may be arranged outside the $\mu$-com. 19. In the first embodiment, drive for opening/closing the cartridge chamber cover and drive for bringing in/pushing out the cartridge are electrically powered. However, only one drive may be electrically powered.

Figure 10:
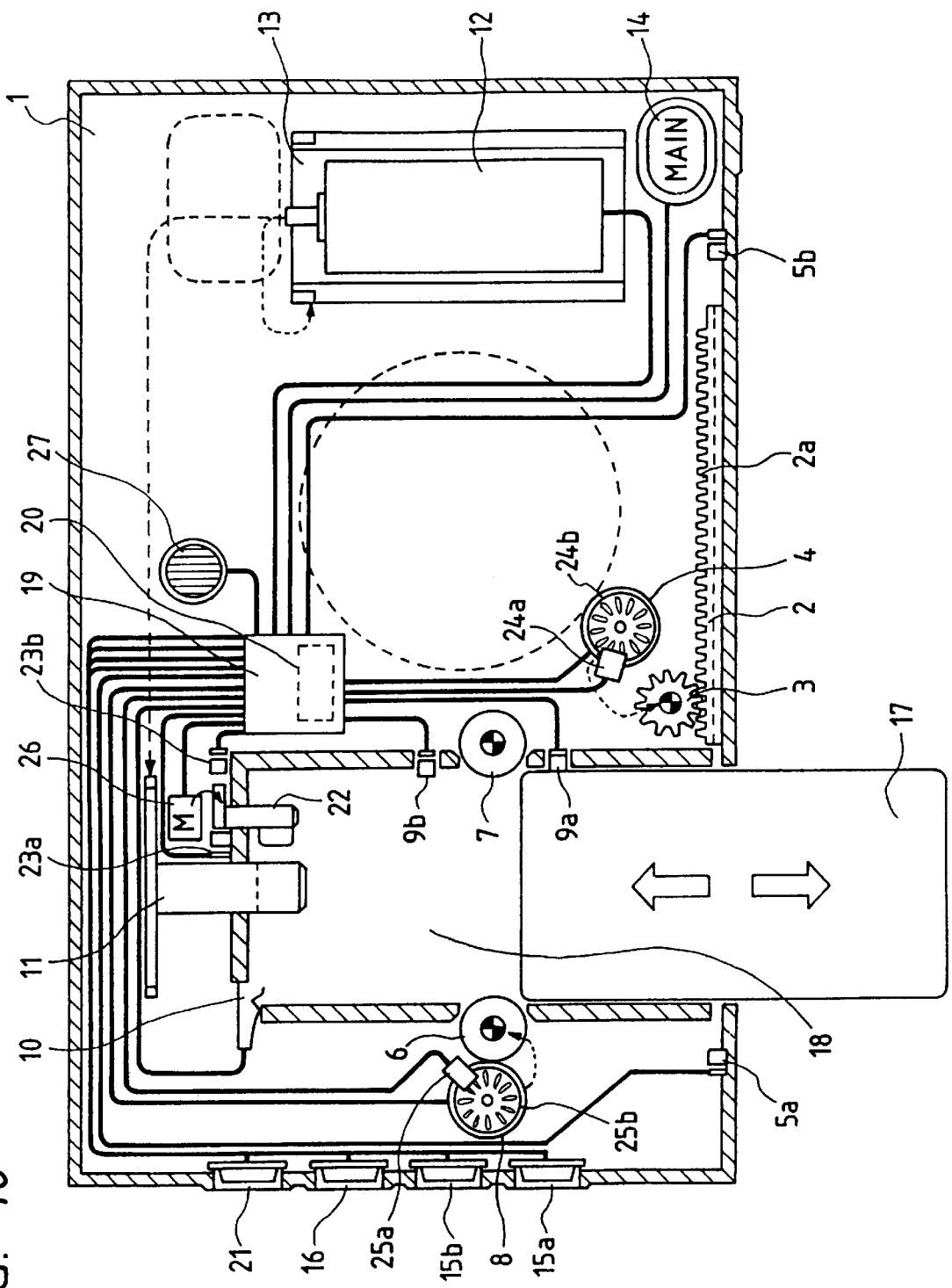
FIG. 10 is a sectional view showing a camera according to the second embodiment of the present invention.

FIG. 10 is a sectional view showing a camera constituting the second embodiment of the present invention. The same reference numerals as in FIG. 1 denote the same components arranged for the same drive purpose. Referring to FIG. 10, a pulse plate 24b is provided on the surface of part of a driving gear 3 through the driving gear 3 to indirectly detect the driving speed of a cartridge chamber cover 2. A photointerrupter 24a reads the pulse of the pulse plate. A pulse plate 25b is provided to part of a driving gear to indirectly detect the carrying speed of the cartridge. A photointerrupter 25a reads the pulse of the pulse plate. The main operations for driving for opening/closing the cartridge chamber cover and driving for carrying the cartridge are performed on the basis of the description of FIG. 1.

Figure 11:
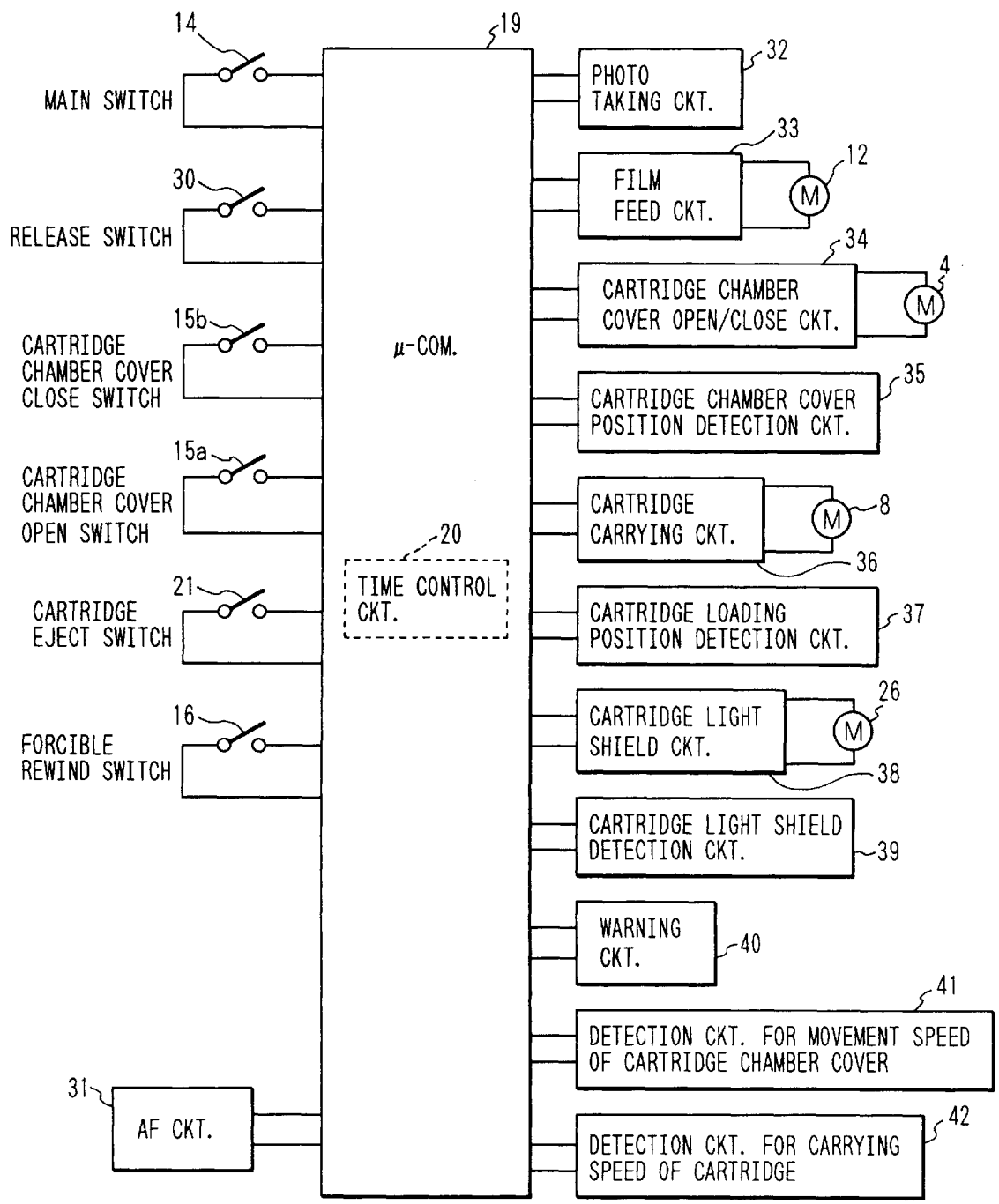
FIG. 11 is a block diagram showing the circuit of the camera in FIG. 10.

FIG. 11 is a block diagram showing the circuit of the camera in FIG. 10. In addition to the first embodiment, a detection circuit 41 for the movement speed of the cartridge chamber cover, including the photointerrupter 24a and the pulse plate 24b, for detecting the movement speed of the cartridge chamber cover 2, and a detection circuit 42 for carrying speed of the cartridge, including the photointerrupter 25a and the pulse plate 25b, for detecting the carrying speed of the cartridge are arranged. In this embodiment, the speed of a driven object is indirectly detected in combination of the pulse plate and the photosensor. However, the detecting means is not limited to this, and the speed of the moving object may be directly detected by continuously arranged photosensors.

The sequence of the structure of this embodiment will be described below. The main sequence for depressing a cartridge chamber cover open switch 15a and the main sequence for depressing a cartridge chamber cover close switch 15b are the same as those of the first embodiment in FIGS. 3A, 3B and 8, and a detailed description thereof will be omitted.

Figure 12:
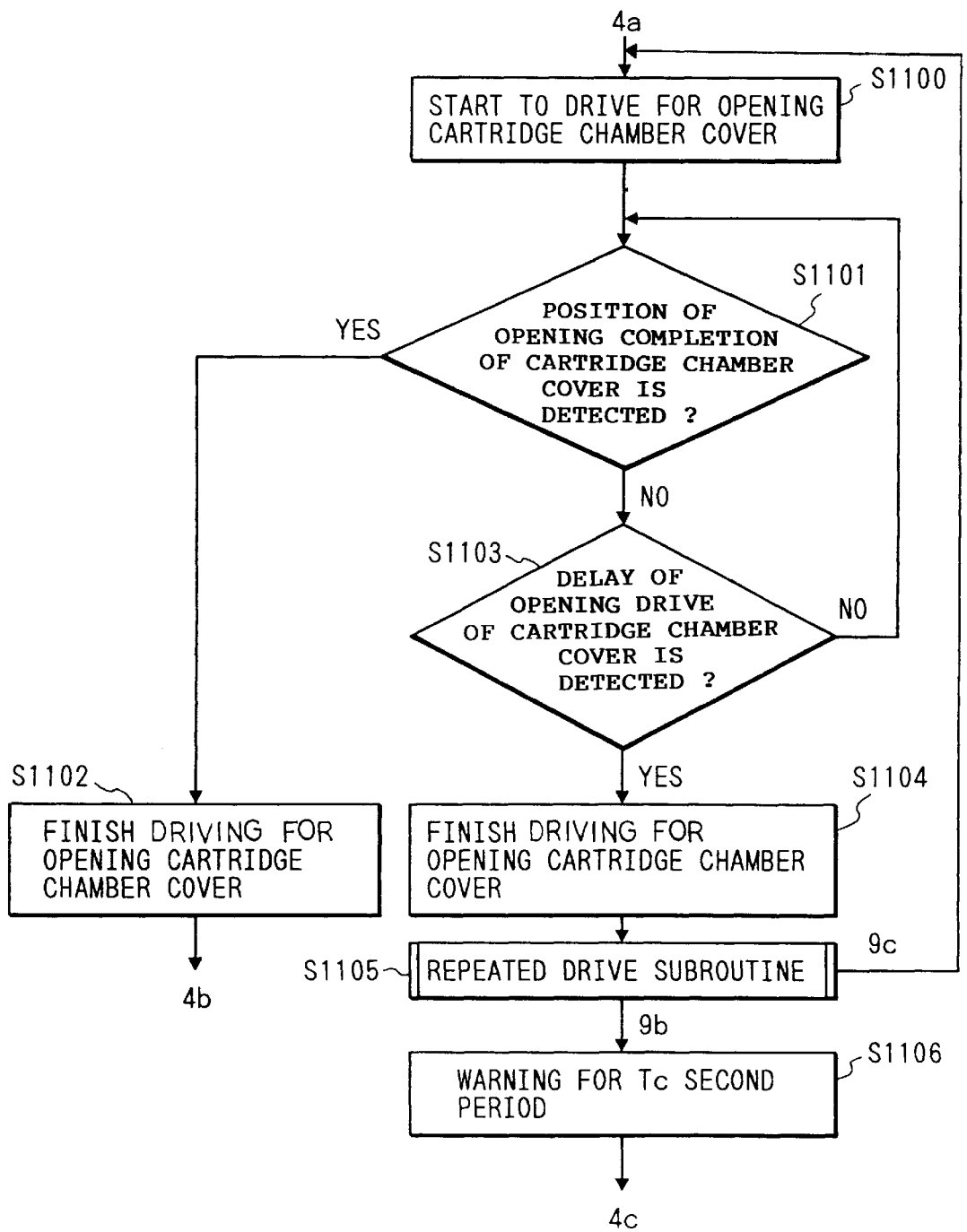
FIG. 12 is a flow chart showing a subroutine for driving for opening a cartridge chamber cover of the camera in FIG. 10.

FIG. 12 shows a subroutine for driving for opening the cartridge chamber cover, which is shown in S304 and S310 of FIGS. 3A and 3B and S809 of FIG. 8. A drive motor for opening the cartridge chamber cover is driven by a cartridge chamber cover open/close circuit 34 (S1100). While the speed of the cartridge chamber cover 2 is detected by the detection circuit 41 for the movement speed of the cartridge chamber cover (S1103), a finish of opening the cartridge chamber cover 2 is repeatedly detected by a cartridge chamber cover position detection circuit 35 (S1101). If the speed of the cartridge chamber cover 2 is not particularly reduced, and opening of the cartridge chamber cover 2 is completed (S1101:YES), the drive for opening the cartridge chamber cover is finished (S1102), and the flow is ended (4b).

If a reduction is detected in the speed of the cartridge chamber cover 2 (S1103:YES), the drive for opening the cartridge chamber cover 2 is immediately stopped (S1104), and the flow advances to the above-described repeated subroutine (S1105). With this repeated drive subroutine, if opening of the cartridge chamber cover 2 is detected (from S1105:9c to S1101:YES), the flow branches to 4b. If the repeated drive subroutine is performed, and the drive of opening the cartridge chamber cover is not completed yet, the camera user is warned by a warning circuit 40 with sound, display, light, or the like that for $T_C$ second period that the desired drive is not completed (S1106), and the flow is ended (4c).

Figure 13:
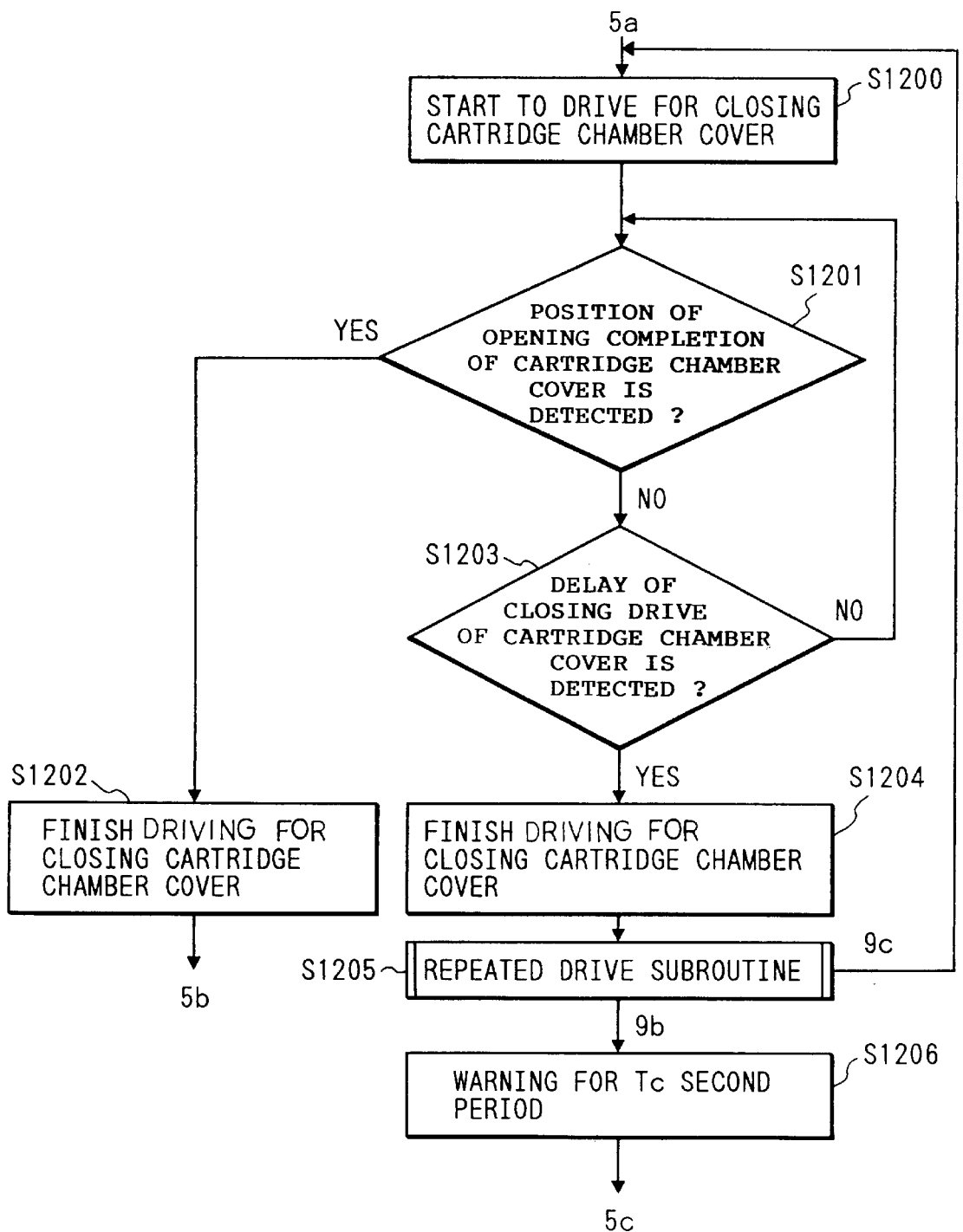
FIG. 13 is a flow chart showing a subroutine for driving for closing the cartridge chamber cover of the camera in FIG. 10.

FIG. 13 shows a subroutine for driving for closing the cartridge chamber cover, which is shown in S306 and S317 of FIG. 3B and S803 of FIG. 8. A drive motor 4 for closing the cartridge chamber cover is driven by the cartridge chamber cover open/close circuit 34 (S1200). While the speed of the cartridge chamber cover 2 is detected by the detection circuit 42 for the movement speed of the cartridge chamber cover (S1203), a finish of closing the cartridge chamber cover is repeatedly detected (S1202). If the speed of the cartridge chamber cover is not particularly reduced, and closing of the cartridge chamber cover 2 is completed (S1202:YES), the drive for closing the cartridge chamber cover is finished (S1202), and the flow is ended (5b).

If a reduction is detected in the speed of the cartridge chamber cover 2 (S1203:YES), the drive for closing the cartridge chamber cover 2 is immediately stopped (S1204), and the flow advances to the above-described repeated subroutine (S1205). With this repeated drive subroutine, if opening of the cartridge chamber cover 2 is detected (from S1205:9c to S1201:YES), the flow branches to 5b. On the other hand, if the repeated drive subroutine is performed and the drive for closing the cartridge chamber cover is not completed yet, the camera user is warned by the warning circuit 41 with sound, display, light, or the like, for the $T_C$ second period that the desired drive is not completed (S1206), and the flow is ended (5c).

Figure 14B:
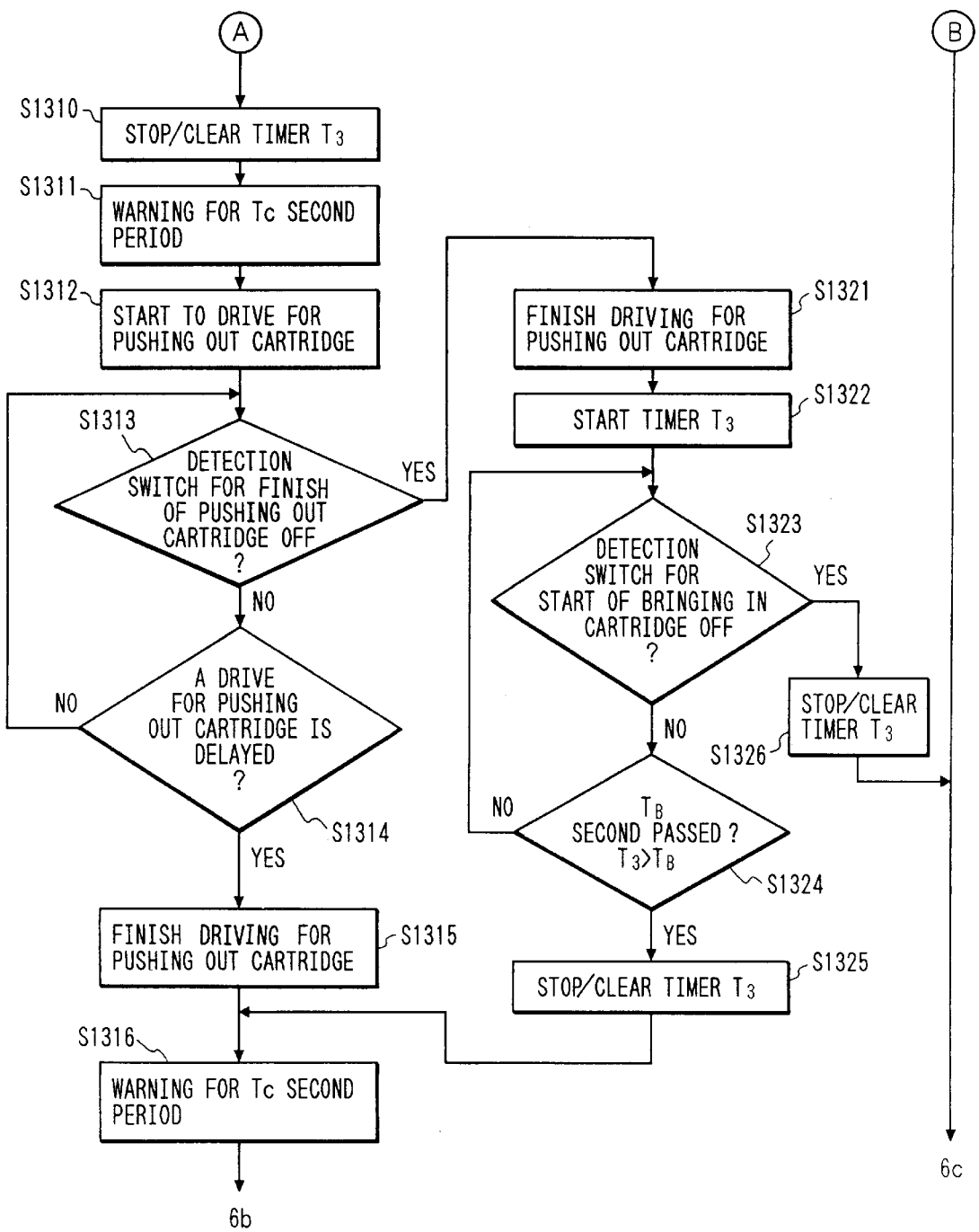
FIG. 14 is comprised of FIGS. 14A and 14B illustrating in flow charts showing a subroutine for driving for bringing in a cartridge in the camera in FIG. 10.

FIGS. 14A and 14B show a subroutine for driving for bringing in the cartridge, which is shown in S305 of FIG. 3A. A timer $T_3$ in a μ-com. 19 is started to count a predetermined cartridge loading wait limit time of $T_A$ second period (S1300). If bringing in of a cartridge 17 in the cartridge chamber is not detected by a detection switch 9a for a start of bringing in the cartridge of a cartridge loading position detection circuit 37 within the $T_A$ second period (S1301:NO, S1317:YES), it is determined that the camera user does not intend to load the cartridge 17. The timer $T_3$ is reset (S1318), and the flow is ended (6c).

If bringing in of the cartridge is detected within the $T_A$ second period (S1301:YES), the timer $T_3$ is reset (S1302). A drive motor 8 for bringing in the cartridge is driven by a cartridge carrying circuit 36 (S1303) to drive a cartridge carrying roller 6 to bring in the cartridge. At this time, a case is assumed in which, although bringing in of the cartridge is detected, the cartridge is not sandwiched between the bringing in rollers for a long time due to a mischief or the like. For this reason, the timer $T_3$ starts to count the predetermined time of $T_A$ second period substantial to carry the brought-in cartridge to the loading completion detection position without any trouble (S1304). Until the predetermined time of $T_A$ second period is counted (S1306), a finish of loading the cartridge is detected by a detection switch 10 for completion of loading the cartridge of the cartridge loading position detection circuit 37 (S1305). At the same time, the detection circuit 42 for the carrying speed of the cartridge detects whether the bringing in speed of the cartridge is not delayed (S1307). If a finish of loading is detected within the predetermined time of $T_A$ second period (S1305:YES), the timer $T_3$ is reset (S1319). The drive for bringing in the cartridge is finished (S1320), and the flow is ended (6c).

If a reduction is detected in the bringing in speed of the cartridge within the predetermined time of $T_A$ second period (S1307:YES), the drive for bringing in the cartridge is immediately stopped (S1308), and the flow advances to the above-described repeated drive subroutine (S1309). If a finish of loading the cartridge is detected until the repeated drive subroutine is performed a predetermined number of times (from S1309:9c to S1305:YES), the flow branches to 6c.

On the other hand, if the predetermined time of $T_A$ second period is counted while the subroutine for driving for bringing in the cartridge is repeatedly performed (S1306:YES), or if the drive for bringing in cannot be completed within a predetermined number of times of the repeated drive subroutine (S1309:9b), the timer $T_3$ is reset (S1310). The camera user is warned by the warning circuit 40 with sound, display, light, or the like for the $T_C$ second period that the drive for loading the cartridge is not completed (S1311). A case is also assumed in which the cartridge 17 is left loaded in a cartridge chamber 18. For this reason, drive for pushing out the cartridge 17 is started by the cartridge carrying circuit 36 to carry the cartridge 17 to a position where the camera user can unload the cartridge 17 (S1312).

More specifically, the cartridge carrying circuit 36 starts to energize the drive motor 8 for pushing out the cartridge to rotate the cartridge carrying roller 6 to push out the cartridge. A detection switch 9b for a finish of pushing out the cartridge of the cartridge loading position detection circuit 37 detects whether the cartridge is located at a position to be unloaded by the camera user (S1313). If the cartridge 17 is not located at the removable position yet, the drive for pushing out is continued until the cartridge 17 is located to the removable position. At the same time, the detection circuit 41 for the carrying speed of the cartridge detects whether the drive for pushing out is not delayed (S1314). If a delay is detected in the drive for pushing out, the cartridge is assumed to be stopped due to some trouble. Therefore, the drive for pushing out is immediately stopped (S1315). The camera user is warned by the warning circuit 40 with sound, display, light, or the like for the $T_C$ second period that the drive for pushing out the cartridge is not completed (S1316), and the flow is ended (6b).

On the other hand, if the cartridge 17 is completely pushed out to the position where it can be unloaded by the camera user (S1313:YES), the drive for pushing out the cartridge 17 is finished (S1321). The timer $T_3$ starts to count a predetermined wait limit time of $T_B$ second period for unloading the cartridge by the camera user (S1322). Until the predetermined time of $T_B$ second period is counted (S1324), unloading of the cartridge 17 from the camera is repeatedly detected (S1323). If the cartridge 17 is not unloaded within the predetermined time of $T_B$ second period (S1324:YES), the timer $T_3$ is reset. The camera user is warned by the warning circuit 40 with sound, display, light, or the like for the $T_C$ second period that the cartridge is not unloaded (S1316), and the flow is ended (6b). On the other hand, if unloading of the cartridge 17 from the camera is detected within the predetermined time of $T_B$ second period (S1323:YES), the timer $T_3$ is reset (S1326), and the flow is ended (6c).

Figure 15B:
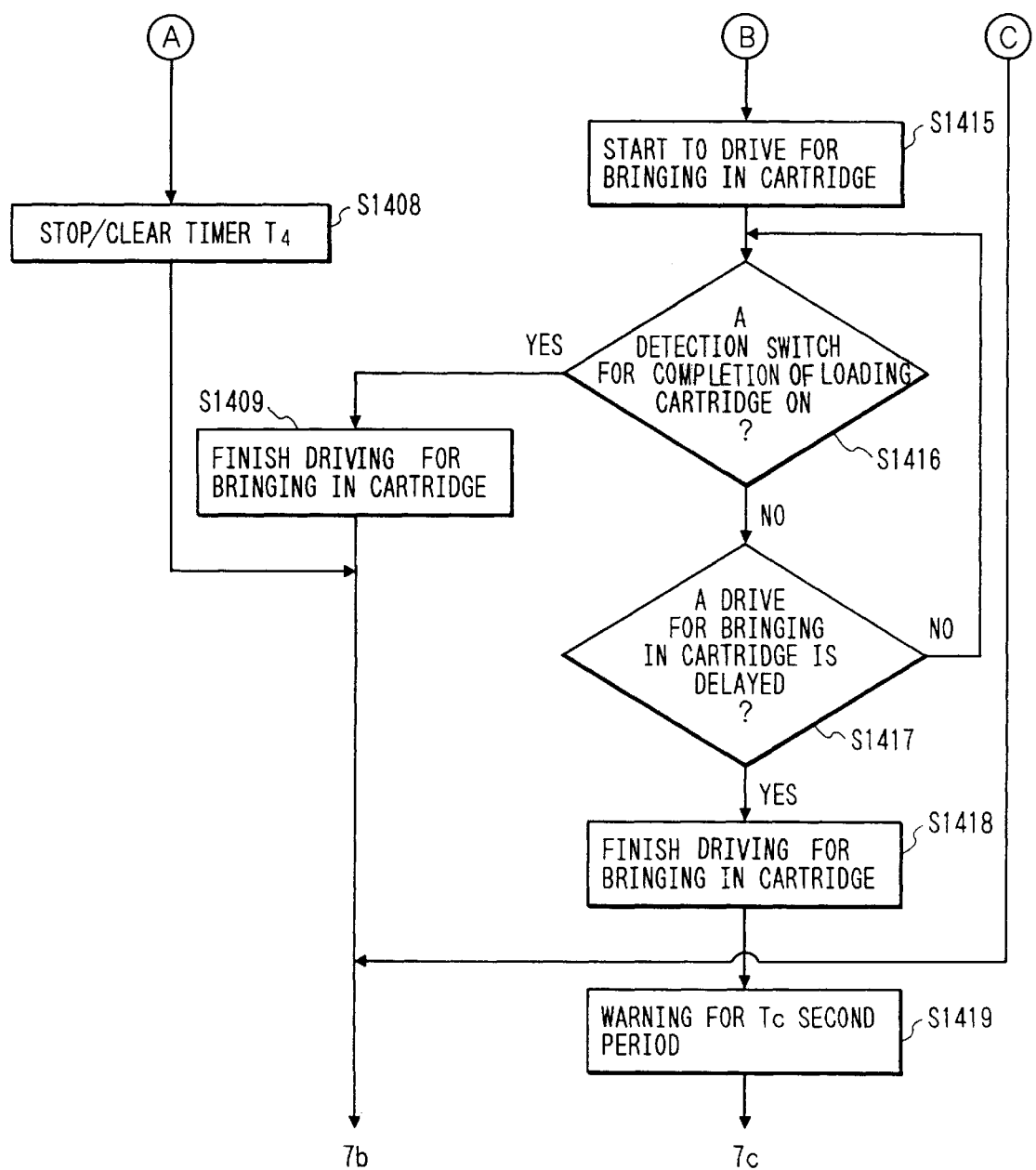
FIG. 15 is comprised of FIGS. 15A and 15B illustrating in flow charts showing a subroutine for driving for pushing out the cartridge from the camera in FIG. 10.

FIGS. 15A and 15B show a subroutine for driving for pushing out the cartridge, which is shown in S316 of FIG. 3B. The drive motor 8 for pushing out the cartridge is driven by the cartridge carrying circuit 36 (S1400) to rotate the cartridge carrying roller 6 so as to push out the cartridge. At the same time, a finish of pushing out is detected by the detection switch 9b for a finish of pushing out the cartridge of the cartridge loading position detection circuit 37 to detect the position of the cartridge in the cartridge chamber (S1401). If the cartridge is not loaded at all, or the cartridge is already located to a position to be unloaded by the camera user (S1401:YES), the drive for pushing out the cartridge is finished (S1402). A timer $T_4$ starts to count a predetermined wait limit time of $T_B$ second period for unloading of the cartridge by the camera user (S1403). If the cartridge is unloaded within the predetermined time of $T_B$ second period, or the cartridge is not loaded at all from the beginning (S1404:YES), the detection switch for the start of bringing in the cartridge of the cartridge loading position detection circuit 3 is turned off (S1404).

The timer $T_4$ is reset (S1408), and the flow is ended (7b).

If the cartridge 17 is not unloaded within the predetermined time of $T_B$ second period (S1406:YES), the timer $T_4$ is reset (S1406). The camera user is warned by the warning circuit 40 with sound, display, light, or the like for $T_C$ second period that the cartridge is not unloaded (S1407).

On the other hand, in an initial state wherein the drive for pushing out the cartridge is to be performed, if the cartridge is loaded at a position where it cannot be unloaded by the camera user (S1401:NO), the drive for pushing out is continued. Unless a delay is detected by the detection circuit 41 for the carrying speed of the cartridge (S1410), detection of pushing out is repeatedly performed. If a delay is detected by the detection circuit 42 for the carrying speed of the cartridge (S1410:YES), the drive for pushing out the cartridge is immediately stopped (S1411), and the flow advances to the above-described repeated drive subroutine (S1412:9a). With this repeated drive subroutine, a finish of pushing out the cartridge is detected (from S1412:9c to S1401:YES), the flow advances to S1402. On the other hand, if completion of pushing out is not detected regardless of the repeated drive (S1412:9b), the camera user is warned by the warning circuit 40 with sound, display, light, or the like for the $T_C$ second period that the drive for pushing out the cartridge is not completed (S1413). The detection switch 10 for the completion of loading the cartridge of the cartridge loading position detection circuit 37 detects whether the cartridge is left completely loaded in the cartridge chamber and not moved, or it is somewhat moved outward from the cartridge chamber (S1414). If the cartridge is completely left loaded (S1414:YES), the flow is ended (7b).

If the cartridge is incompletely pushed out (S1414:NO), the drive motor 8 for bringing in the cartridge is driven by the cartridge carrying circuit 36 so as to rotate the carrying roller 6 for bringing in the cartridge into the camera again (S1415). If completion of bringing in is detected by the detection switch 10 for the completion of loading the cartridge of the cartridge loading position detection circuit 37 (S1416:YES), the drive for bringing in the cartridge is finished (S1409), and the flow is ended (7b).

If the cartridge is not moved, the drive for bringing in cannot be performed, and a delay is detected by the detection circuit 42 for the carrying speed of the cartridge (S1417:YES), the drive for bringing in the cartridge is stopped in a state wherein the cartridge is incompletely loaded (S1418). The camera user is warned by the warning circuit 40 with sound, display, light, or the like for the $T_C$ second period that the drive for bringing in the cartridge is not completed (S1418), and the flow is ended (7c).

The same repeated drive subroutine as in FIG. 9 of the first embodiment is also used in this embodiment.

Figure 16B:
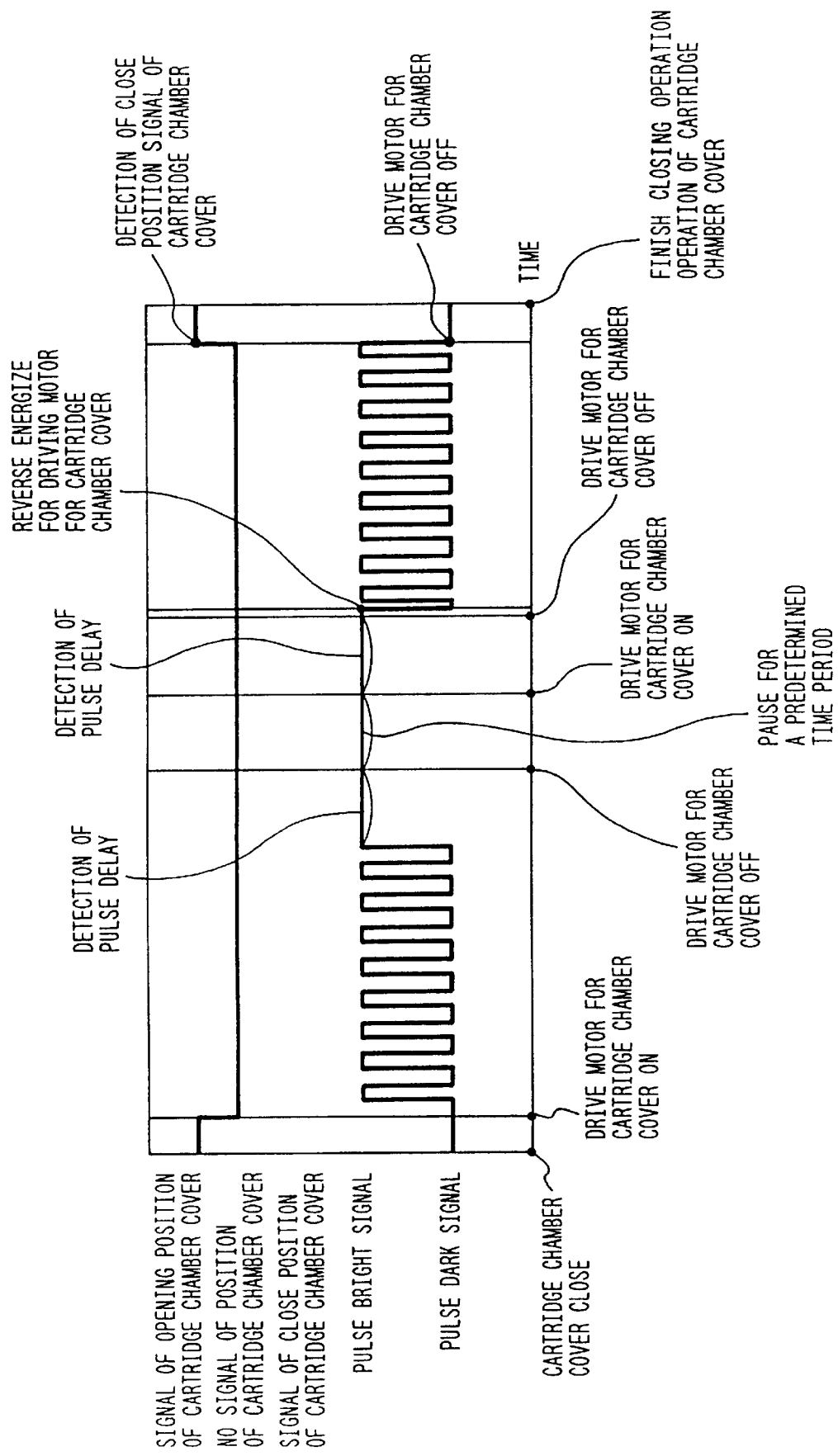
Figure 17A:
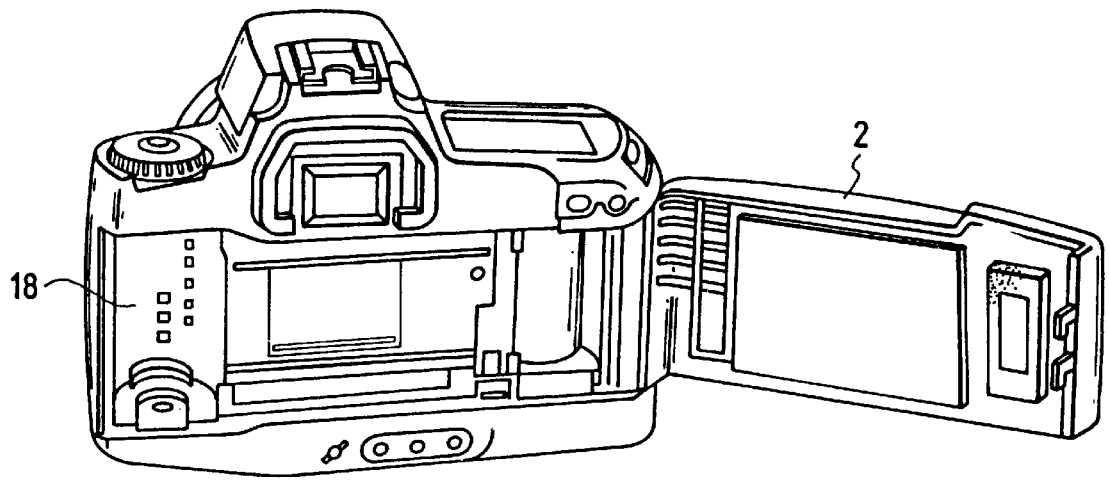
FIGS. 17A and 17B are views showing a conventional method of loading a cartridge in a camera.
Figure 17B:
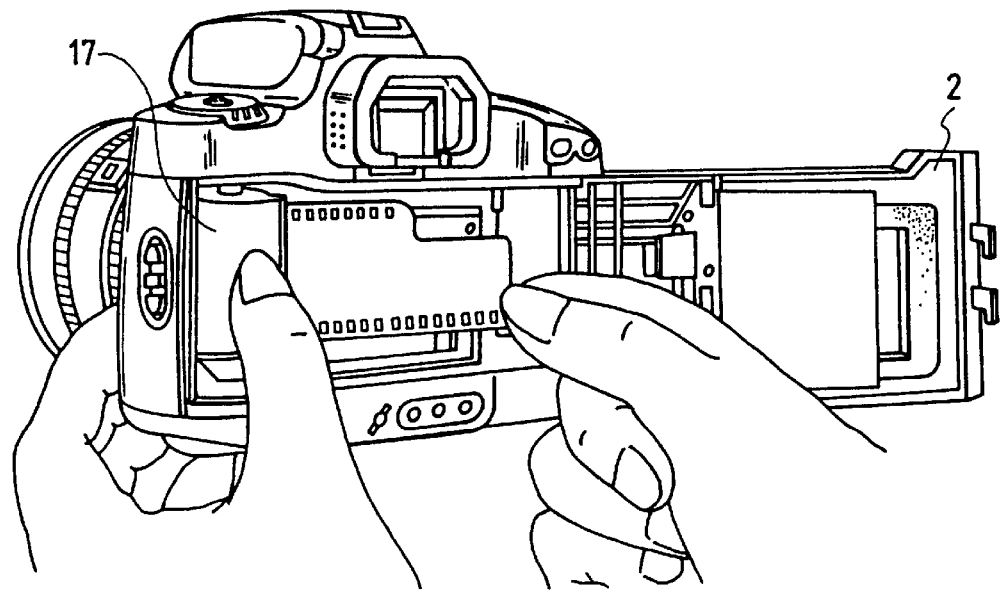

FIGS. 16A and 16B show a detection example of the cartridge chamber cover by using the pulse plate and the photosensor in this embodiment. As shown in FIG. 10, the pulse plate is precisely rotated together with the driving gear array arranged through a rack portion of the cartridge chamber cover 2 in an interlocked manner, including slight backlash. Therefore, the waveform of a pulse wave can be considered to be linear with respect to the speed of the cartridge chamber cover.

For example, part of an operation for closing the cartridge chamber cover in FIG. 8 of this embodiment will be described. Referring to FIG. 8, the sequence from start to drive for closing the cartridge chamber cover (S800 to S803) to detection of a finish of driving of the cartridge and stop of driving for closing (S803:5b) corresponds to FIG. 16A. Before drive for closing the cartridge chamber cover is started, the opening position is detected by the cartridge chamber cover position detecting means. When the drive for closing is started, a signal of the position of the cartridge chamber cover is present no longer, and pulses are generated in accordance with the movement of the driving means. The pulses are counted in a unit time. If the number of pulses per unit time reaches a predetermined number, it is determined that the drive for the cartridge chamber is not delayed, and the drive is continued. Upon depressing the detection switch 5a for a finish of closing the cartridge chamber cover, the drive for the motor is finished, thereby stopping the pulses.

FIG. 15B shows the sequence in FIG. 8 in which drive for closing the cartridge chamber cover is started (S800 to S803), a delay of the detection pulses for the carrying speed of the cartridge chamber cover is detected during driving for closing the cartridge chamber cover (S1203:YES), the drive is stopped (S1204), the cartridge is not moved yet regardless of the drive for closing the cartridge chamber cover once more, and a delay is detected again (S1205:9b), and the initial position is restored by reversely driving the cartridge chamber cover (S1100 to S1102).

Before the drive for closing the cartridge chamber cover is started, the cartridge chamber cover 2 is depressing the detection switch 5b for the opening position. When the drive of the cartridge chamber cover 2 is started, a signal of the position detection of the cartridge chamber cover is present no longer, and pulses are generated. If the cartridge chamber cover is smoothly moved, the pulse wave generates a predetermined number or more of waves per unit time. However, if the cartridge is not smoothly moved due to some trouble, or stopped, the number of pulses per unit time is excessively decreased, or disappeared as shown in FIG. 15B. At this time, the number of pulses per unit time becomes smaller than a predetermined pulse threshold value. A reduction is detected in the movement speed of the cartridge chamber cover, and the drive is immediately stopped.

After a pause for a wait time during the repeated drive subroutine, the same drive for closing the cartridge chamber cover is performed again. At this time, no pulse is generated, and a delay is detected, so the drive is immediately stopped. To prevent the cartridge chamber from being incompletely opened, the reverse drive of the cartridge chamber cover is performed, and pulses are generated again. When the cartridge chamber cover depresses the detection switch for a finish of opening again, the drive for opening the cartridge chamber cover is finished, thereby stopping the pulses. If the driving speed of drive for opening/closing the cartridge chamber cover 2, or drive for bringing in/pushing out the cartridge is to be detected in accordance with generation of pulses, the same detection form as shown in FIG. 16 is performed.

As described above, according to the second embodiment of the present invention, the following effects can be obtained in addition to the effects of the first embodiment.

Since the camera electrically performs driving for opening/closing the cartridge chamber cover or driving for bringing in/pushing out the cartridge, a trouble during each drive can be rapidly and accurately detected by using the driving speed detecting means as compared to the first embodiment using only the timer. In addition, since a trouble can be detected in a short period of time, the trouble state can be stopped in a short period of time. Destruction of the internal mechanism of the camera can be further prevented.

The present invention can also be applied to a camera using a cartridge having a movable light shield door or the like of a form other than that described in this specification.

The present invention can also be applied to an image recording medium other than a film.

The present invention can also be applied to a device using a cartridge of a form other than that described in this specification, a cartridge having an image recording medium other than a film, cartridges of other types, or a loading matter other than a cartridge.

The present invention may be realized by combining the above embodiments or their technical elements as needed.

In the present invention all of the claims or embodiments or part thereof may constitute an independent apparatus an apparatus combined with another apparatus, or an element constituting an apparatus.

The present invention can also be applied to cameras of various types such as a single-lens reflex camera, a lens-shutter camera, and a video camera, optical equipments other than cameras or other apparatuses, an apparatus applied to these cameras, optical equipments, and other apparatuses, or elements constituting these apparatuses.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted to use an image recording medium cartridge having a cover for allowing an image recording medium to exit from or withdraw into the image recording medium cartridge, the camera comprising:
   a cartridge chamber;
   a cartridge chamber cover;
   an operation device that automatically operates said cartridge chamber cover; and
   a determination device, responsive to a start of operation of the operation device, that measures an operation time of said operation device and determines an operation state of said operation device based on the operation time of said operation device.

2. A camera according to claim 1, wherein the image recording medium comprises a film.

3. A camera according to claim 1, wherein the cover of the cartridge comprises light shield means.

4. A camera according to claim 1, wherein said operation device comprises a loading mechanism for performing at least one of an operation for moving the cartridge into the camera and an operation for moving the cartridge out of the camera.

5. A camera according to claim 1, wherein said determination device comprises means for determining an operation speed of said operation device.

6. A camera according to claim 1, further comprising an opening device which opens a cover of the cartridge, said opening device preventing an opening operation when a loading operation of the cartridge by said operation device takes more than a predetermined time.

7. A camera according to claim 1, wherein said operation device comprises a power drive unit.

8. A camera according to claim 1, wherein said operation device comprises a motor.

9. A camera according to claim 1, where said determination device comprises means for restarting said operation device after temporarily stopping an operation of said operation device when an operation of said operation device take more than a predetermined time.

10. A camera according to claim 9, wherein said determination device comprises means for causing said operation device to repeat an operation until a number of restarting operations of said operation device reaches a predetermined number.

11. A camera according to claim 10, wherein said determination device comprises means for causing said operation device to repeat an operation until an operation of said operation device does not take more than the predetermined time.

12. A camera according to claim 9, wherein said determination device comprises means for causing said operation device to repeat an operation until an operation of said operation device does not take more than the predetermined time.

13. A camera according to claim 1, further comprising an information device for providing information indicating a detection result of the determination device to a user.

14. A camera according to claim 1, wherein said determination device comprises means for causing said operation device to perform a reverse operation when an operation of said operation device takes more than a predetermined time.

15. A camera according to claim 1, wherein said determination device comprises means for automatically closing a cover for allowing at least one of a loading operation and an unloading operation of the cartridge with respect to the camera after a predetermined operation of said operation device.

16. A camera according to claim 1, wherein said operation device comprises means for performing at least one of an operation for opening a cover of the cartridge and an operation for closing the cover of the cartridge, and said determination device comprises means for maintaining a relationship of an operational order of the operation related to at least one of a loading operation and an unloading operation of the cartridge by said operation device and at least one of an operation for opening the cover of the cartridge and an operation for closing the cover of the cartridge.

17. An apparatus adapted to use an image recording medium cartridge having a cover for allowing an image recording medium to exit from or withdraw into the image recording medium cartridge, the apparatus comprising:

a cartridge chamber;

a cartridge chamber cover;

an operation device that automatically operates said cartridge chamber cover; and a determination device, responsive to a start of operation of said operation device, that measures an operation time of said operation device and determines an operation state of said operation device based on the operation time of said operation device.

18. An apparatus according to claim 17, wherein the image recording medium comprises a film.

19. An apparatus according to claim 17, wherein said operation device comprises a loading mechanism for performing at least one of an operation for moving the cartridge into the apparatus and an operation for moving the cartridge out of the apparatus.

20. An apparatus according to claim 17, further comprising an opening device which opens a cover of the cartridge, said opening device preventing an opening operation when a loading operation of the cartridge by said operation device takes more than a predetermined time.

21. An apparatus adapted to use an image recording medium cartridge having a light shield portion for an image recording medium, the apparatus comprising:

a cartridge chamber;

a cartridge chamber cover;

an operation device that automatically operates said cartridge chamber cover; and a determination device, responsive to a start of operation of said operation device, that measures an operation time of said operation device and determines an operation state of said operation device based on the operation time of said operation device.

22. An apparatus according to claim 21, wherein said apparatus comprises a camera.

* * * * *

UNITED STATES PATENT AND TRADEMARK OFFICE
CERTIFICATE OF CORRECTION

PATENT NO. : 5,930,537

DATED : July 27, 1999

INVENTOR(S): RYOJI OKUNO, ET AL.

It is certified that error appears in the above-identified patent and that said Letters Patent is hereby corrected as shown below:

Title page,

At [56] References Cited

U.S. PATENT DOCUMENTS

"Ueda" should read --Ueda et al.--.

Column 7

Line 36, "substantial" should read --substantially--.

Column 9

Line 24, "to" should read --to be--.

UNITED STATES PATENT AND TRADEMARK OFFICE
CERTIFICATE OF CORRECTION

PATENT NO. : 5,930,537

DATED : July 27, 1999

INVENTOR(S): RYOJI OKUNO, ET AL.

It is certified that error appears in the above-identified patent and that said Letters Patent is hereby corrected as shown below:

Column 17

Line 10, "a" should be deleted.
    Line 13, "a" should be deleted.
    Line 35, "equipments" should read --equipment--.

Column 18

Line 22, "where" should read --wherein--.
    Line 25, "take" should read --takes--.

Signed and Sealed this

Eighth Day of February, 2000

Attest:

Attesting Officer

Q. TODD DICKINSON

Commissioner of Patents and Trademarks